United States Patent
Miyamae

(10) Patent No.: US 8,872,496 B2
(45) Date of Patent: Oct. 28, 2014

(54) DC-DC CONVERTER AND METHOD OF CONTROLLING DC-DC CONVERTER

(71) Applicant: Fujitsu Semiconductor Limited, Yokohama (JP)

(72) Inventor: Toru Miyamae, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 212 days.

(21) Appl. No.: 13/716,137

(22) Filed: Dec. 15, 2012

(65) Prior Publication Data

US 2013/0162230 A1   Jun. 27, 2013

(30) Foreign Application Priority Data

Dec. 22, 2011   (JP) ................................. 2011-282068

(51) Int. Cl.
G05F 1/618   (2006.01)
G05F 1/46   (2006.01)

(52) U.S. Cl.
CPC ...................................... G05F 1/46 (2013.01)
USPC ......................................... 323/285; 327/543

(58) Field of Classification Search
USPC ......... 323/207, 222, 224, 268, 271, 282–290; 363/16–20, 21.01, 56, 60, 89, 124, 363/127; 327/108, 205, 337, 530, 535–540, 327/543
See application file for complete search history.

(56) References Cited

U.S. PATENT DOCUMENTS

| 5,497,117 | A | * | 3/1996 | Nakajima et al. | 327/404 |
| 5,731,731 | A | * | 3/1998 | Wilcox et al. | 327/403 |
| 6,853,174 | B1 | * | 2/2005 | Inn | 323/285 |
| 8,253,397 | B2 | * | 8/2012 | Collins | 323/271 |
| 2010/0308785 | A1 | | 12/2010 | Couleur | |
| 2011/0001462 | A1 | | 1/2011 | Couleur | |

FOREIGN PATENT DOCUMENTS

JP   2007-288935   11/2007

* cited by examiner

*Primary Examiner* — Rajnikant Patel
(74) *Attorney, Agent, or Firm* — Fujitsu Patent Center

(57) ABSTRACT

A DC-DC converter includes a drive circuit configured to drive a first switching element, and a second switching element coupled between a low potential power terminal of the drive circuit and a first node corresponding to the input voltage or the output voltage. A current detecting section detects a load current flowing in the output terminal. A control circuit turns on a third switching element, which is coupled between the low potential power terminal of the drive circuit and a second node having a potential lower than both the input voltage and the output voltage, in a case where a difference between the input voltage and the output voltage is lower than a threshold. The control circuit controls the second and third switching elements based on a detection result of the current detecting section in a case where the difference is equal to or greater than the threshold.

12 Claims, 17 Drawing Sheets

DC-DC CONVERTER AND METHOD OF CONTROLLING DC-DC CONVERTER

CROSS-REFERENCE TO RELATED APPLICATIONS

This application is based upon and claims the benefit of priority from prior Japanese Patent Application No. 2011-282068, filed on Dec. 22, 2011, the entire contents of which are incorporated herein by reference.

FIELD

The present disclosure relates to a DC-DC converter and a method of controlling the DC-DC converter.

BACKGROUND ART

Electronic devices such as a personal computer include a switching power circuit (DC-DC converter) that supplies a drive voltage to an internal circuit that performs signal processing. The switching power circuit converts a direct current voltage supplied for example from an AC adapter or a battery to the drive voltage suitable for an operation of the internal circuit. The switching power circuit controls on/off of a main switch to generate an output voltage by raising and reducing the direct current input voltage, and in the meantime performs a feedback control to maintain the output voltage at a constant voltage corresponding to a load.

The main switch is for example a MOS transistor. The MOS transistor has a parasitic capacitance formed between a control terminal and other terminal (source terminal or drain terminal). A drive circuit drives the MOS transistor (turns the MOS transistor on and off) by charging or discharging a gate terminal of the MOS transistor (parasitic capacitance). A current flows from the gate terminal of the MOS transistor to a low potential power source (for example, ground) by the discharge, and this current becomes a loss to a power voltage. This loss is referred to as a Qg loss. Here, Qg is a charge amount that is accumulated in the gate terminal.

An amount of consumed current in a load of an electronic device changes depending on an operating state of the electronic device. A method to improve efficiency of the DC-DC converter upon a heavy load state requiring a relatively large amount of current is to make an on-resistance value of the MOS transistor small, that is, to make a size of the MOS transistor large. However, the charge amount Qg accumulated in the gate terminal is proportionate to the size of the MOS transistor. For example, making the size of the MOS transistor large increases the accumulated charge amount Qg, by which the loss is increased. For example, when the size of the MOS transistor is made small in order to reduce the loss, that is, to make the charge amount Qg small, the on-resistance value of the MOS transistor becomes high, and the conversion efficiency upon the heavy load state decreases.

Another method to reduce the loss is to supply the charges accumulated in the gate terminal to an output terminal of the DC-DC converter. The DC-DC converter for carrying out this method includes a switch coupled between the gate terminal of the MOS transistor and the output terminal, for example, and this switch is turned on or off upon switching the MOS transistor on or off. Due to this, the charges accumulated in the gate terminal are supplied to the output terminal. For example, refer to Japanese Laid-Open Patent Publication No. 2007-288935, US 2010/0308785, and US 2011/0001462.

As described above, in the MOS transistor including the gate terminal to which the switch is coupled, since an output terminal voltage is applied to the gate terminal by the switch being turned on, the on-resistance value becomes large compared to a case where the switch is not used. The increase in the on-resistance value leads to the efficiency reduction of the DC-DC converter.

SUMMARY

According to an aspect of the embodiments, a DC-DC converter that converts an input voltage to an output voltage is provided. The DC-DC converter includes a first switching element; a drive circuit coupled to the first switching element and configured to drive the first switching element so as to convert the input voltage to the output voltage; a second switching element coupled between a low potential power terminal of the drive circuit and a first node corresponding to the input voltage or the output voltage; a third switching element coupled between the low potential power terminal of the drive circuit and a second node having a potential lower than both the input voltage and the output voltage; a current detecting section configured to detect a load current flowing in an output terminal of the DC-DC converter; and a control circuit configured to turn on the third switching element in a case where a difference between the input voltage and the output voltage is lower than a threshold, and to control the second switching element and the third switching element based on a detection result of the current detecting section in a case where the difference is equal to or greater than the threshold.

The object and advantages of the invention will be realized and attained by means of the elements and combinations of particularly pointed out in the claims.

It is to be understood that both the foregoing general description and the following detailed description are exemplary and explanatory and are not restrictive of the invention.

DESCRIPTION OF EMBODIMENTS

A DC-DC converter 1 of a first embodiment will be described with reference to FIGS. 1 to 7.

Figure 1:
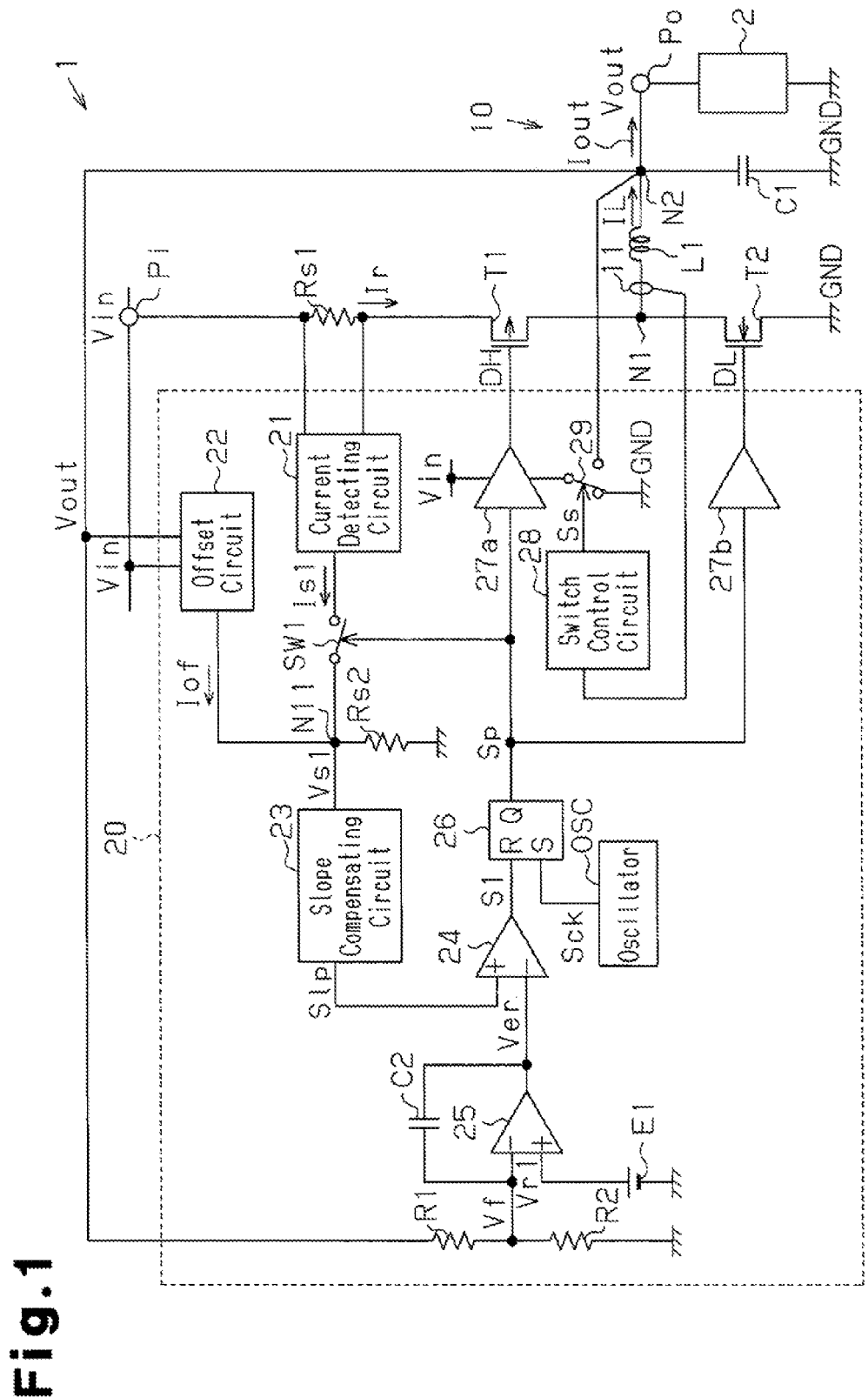
FIG. 1 is a circuit diagram of a DC-DC converter of a first embodiment.

The DC-DC converter 1 is a step-down DC-DC converter using a synchronous rectification scheme. As illustrated in FIG. 1, the DC-DC converter 1 converts an input voltage Vin supplied to an input terminal Pi to an output voltage Vout that is lower than the input voltage Vin. This output voltage Vout is supplied to an output terminal Po to which a load 2 is coupled.

The DC-DC converter 1 includes a converting section 10 that generates the output voltage Vout, and a controlling section 20 that controls the converting section 10. The input voltage Vin is supplied to a first terminal of a resistance Rs1. A second terminal of the resistance Rs1 is coupled to a transistor T1 of the converting section 10. The transistor T1 is for example a P-channel MOS transistor. A first terminal (source terminal) of the transistor T1 is coupled to the second terminal of the resistance Rs1. A second terminal (drain terminal) of the transistor T1 is coupled to a transistor T2. A control terminal (gate terminal) of the transistor T1 is coupled to the controlling section 20. The transistor T1 turns on or off according to a drive signal DH supplied from the controlling section 20.

The transistor T2 is for example an N-channel MOS transistor. A first terminal (source terminal) of the transistor T2 is coupled to a line with a potential (for example, zero volts) lower than the input voltage Vin and the output voltage Vout. This line in the example illustrated in the drawing is a ground GND, and in another example, it is a low potential power source line. A second terminal (drain terminal) of the transistor T2 is coupled to the transistor T1. A control terminal (gate terminal) of the transistor T2 is coupled to the controlling section 20. The transistor T2 turns on or off according to a drive signal DL supplied from the controlling section 20.

A node N1 between the drain terminal of the transistor T1 and the drain terminal of the transistor T2 is coupled to a first terminal of an inductor L1. A second terminal of the inductor L1 is coupled to the output terminal Po. A node N2 between the second terminal of the inductor L1 and the output terminal Po is coupled to a first terminal of a capacitor C1. A second terminal of the capacitor C1 is coupled to the ground GND. The capacitor C1 is included in a smoothing circuit that smoothes the output voltage Vout.

The load 2 is for example an internal circuit (ASIC, memory, CPU, liquid crystal display device, etc.) of an electronic device. The number of circuits that operates in the load changes depending on an operating state of the internal circuit and supplied power. When a state of the load 2 changes, an amount of current (load current) depending on the state of the load 2 varies. For example, the output voltage Vout rises when the load 2 assumes a light load state, and the output voltage Vout drops in a heavy load state. Thus, the controlling section 20 adjusts a duty of a control signal Sp (ratio of time in an H level relative to time in an L level) according to the output voltage Vout and an output current Iout. In one example, a ratio of on-time relative to a switching cycle (on-duty) may be used as the duty.

Both terminals of the resistance Rs1 are coupled to a current detecting circuit 21 of the controlling section 20. The current detecting circuit 21 detects a current Ir flowing in the resistance Rs1 based on a potential difference between the two terminals of the resistance Rs1, and outputs a sense current Is1 proportionate to the current Ir. The current Ir flowing in the resistance Rs1 flows to the transistor T1 on a higher potential side, and then flows to the inductor L1 via the transistor T1. Accordingly, the current detecting circuit 21 detects the current flowing in the inductor L1, and outputs the sense current Is1 proportionate to the detected current.

An output terminal of the current detecting circuit 21 is coupled to a first terminal of a resistance Rs2 via a switch SW1. A second terminal of the resistance R2 is coupled to the ground GND. The switch SW1 turns on or off according to a control signal Sp supplied to a control terminal. A node N11 between the switch SW1 and the resistance Rs2 is coupled to an offset terminal of an offset circuit 22.

Figure 2:
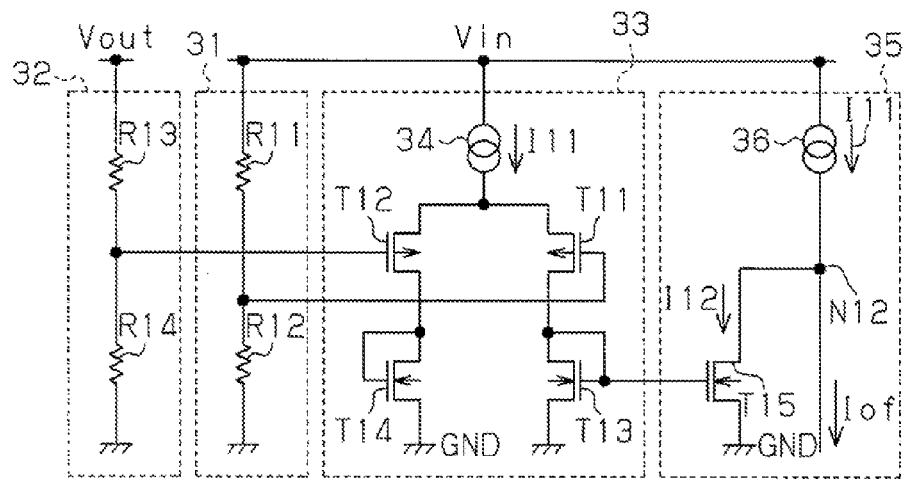
FIG. 2 is a circuit diagram of an offset circuit.

The offset circuit 22 outputs an offset current Iof generated based on the input voltage Vin and the output voltage Vout. As illustrated in FIG. 2, the offset circuit 22 includes voltage divider circuits 31, 32, a differential amplifier circuit 33, and a subtractor circuit 35.

The voltage divider circuit 31 includes two resistances R11, R12 that are serially coupled. The input voltage Vin is supplied to a first terminal of the resistance R11. A second terminal of the resistance R11 is coupled to a first terminal of the resistance R12. A second terminal of the resistance R12 is coupled to the ground GND. The voltage divider circuit 31 divides the input voltage Vin in accordance with the resistance ratio of the resistances R11, R12 to generate a first partial voltage at a node between the resistances R11, R12. Accordingly, the first partial voltage is proportionate to the input voltage Vin.

The voltage divider circuit 32 includes two resistances R13, R14 that are serially coupled. The output voltage Vout is supplied to a first terminal of the resistance R13. A second terminal of the resistance R13 is coupled to a first terminal of the resistance R14. A second terminal of the resistance R14 is coupled to the ground GND. The voltage divider circuit 32 divides the output voltage Vout in accordance with the resistance ratio of the resistances R13, R14 to generate a second partial voltage at a node between the resistances R13, R14. Accordingly, the second partial voltage is proportionate to the output voltage Vout.

The differential amplifier circuit 33 includes a constant current source 34, and transistors T11, T12, T13, T14. The transistors T11, T12 are for example P-channel MOS transistors, and the transistors T13, T14 are for example N-channel MOS transistors. The input voltage Vin is supplied to a first terminal of the constant current source 34. A second terminal of the constant current source 34 is coupled to source terminals of both transistors T11, T13. The first partial voltage from the voltage divider circuit 31 is supplied to a gate terminal of the transistor T11, and the second partial voltage from the voltage divider circuit 32 is supplied to a gate terminal of the transistor T12.

A drain terminal of the transistor T11 is coupled to a drain terminal and a gate terminal of the transistor T13. A source terminal of the transistor T13 is coupled to the ground GND. A drain terminal of the transistor T12 is coupled to a drain terminal and a gate terminal of the transistor T14. A source terminal of the transistor T14 is coupled to the ground GND. The gate terminal of the transistor T13 is coupled to the subtractor circuit 35.

The subtractor circuit 35 includes a constant current source 36 and a transistor T15. The transistor T15 is for example an N-channel MOS transistor. The input voltage Vin is supplied to a first terminal of the constant current source 36. A second terminal of the constant current source 36 is coupled to a drain terminal of the transistor T15. A gate terminal of the transistor T15 is coupled to the gate terminal of the transistor T13 of the differential amplifier circuit 33, and a source terminal of the transistor T15 is coupled to the ground GND. A node N12 between the constant current source 36 and the transistor T15 is coupled to the node N11 illustrated in FIG. 1. The subtractor circuit 35 outputs the offset current Iof from the node N12 between the constant current source 36 and the transistor T15.

The constant current source 36 of the subtractor circuit 35 and the constant current source 34 of the differential amplifier circuit 33 are set to generate an equaling current I11. The current I11 from the constant current source 34 of the differential amplifier circuit 33 is distributed to the transistor T11 and the transistor T12. Each of the current flowing in the transistor T11 and the current flowing in the transistor T12 corresponds to a gate voltage of the corresponding transistor, that is, a difference voltage of the input voltage Vin (first partial voltage) and the output voltage Vout (second partial voltage). A current I12 flowing in the transistor T15 of the subtractor circuit 35 is equal to the current flowing in the transistor T11. Accordingly, the offset current Iof output from the subtractor circuit 35 comes to be at a value equal to a difference between the current I11 which the constant current source 36 flows and the current I12 which the transistor T15 flows.

In one example, voltage dividing ratios of the voltage divider circuits 31, 32 are set such that the transistor T13 turns off and the current I11 flows via the transistor T11 when the input voltage Vin is equal to the output voltage Vout (when an on-duty is 100%). Further, the voltage dividing ratios of the voltage divider circuits 31, 32 are set such that the transistor T11 turns off and the current I11 flows via the transistor T13 when the input voltage Vin is equal to twice the output voltage Vout (when the on-duty is 50%).

Figure 4:
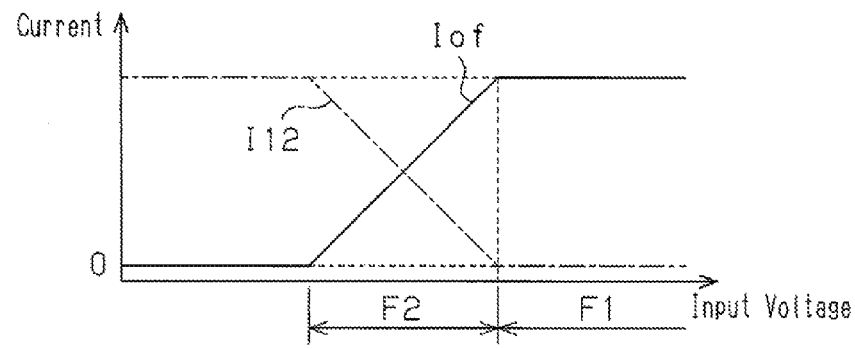
FIG. 4 is a waveform diagram of currents in the offset circuit.

The offset circuit 22 generates the offset current Iof that changes as illustrated in FIG. 4. When the input voltage Vin is higher than a voltage that is twice the output voltage Vout (Vin>2Vout), the offset circuit 22 outputs the offset current Iof that is equal to the current I11. When the input voltage Vin is equal to the output voltage Vout, the offset circuit 22 does not output the offset current Iof (offset current Iof is 0(A)). When the input voltage Vin is higher than the output voltage Vout and lower than the voltage that is twice the output voltage Vout (Vout<Vin<2Vout), the offset circuit 22 causes the offset current Iof to change in a linear manner according to the difference voltage of the input voltage Vin and the output voltage Vout.

As illustrated in FIG. 1, the sense current Is1 output from the current detecting circuit 21 flows to the switch SW1 that is in an on-state and the resistance Rs2. A potential difference proportionate to the sense current Is1 is generated between the two terminals of the resistance Rs2. This potential difference is proportionate to the current Ir that flows in the resistance Rs1 for detection.

The offset current Iof output from the offset circuit 22 flows to the resistance Rs2. Accordingly, during when the switch SW1 is in an off-state, the offset current Iof flows in the resistance Rs2. The resistance Rs2 has the potential difference proportionate to the offset current Iof generated between its two terminals. On the other hand, during when the switch SW1 is in the on-state, a current in which the offset current Iof and the sense current Is1 are combined flows in the resistance Rs2. Accordingly, the resistance Rs2 has the potential difference proportionate to the current, in which the offset current Iof and the sense current Is1 are combined, and which is generated between its two terminals. In a case where the offset current Iof is not supplied, when the switch SW1 is turned off, the potential of the node N11 comes to be at the ground GND level by the resistance Rs2. Accordingly, a waveform of a sense voltage Vs1 at the node between the switch SW1 and the resistance Rs2 is offset from the ground GND according to the current Ir flowing in the resistance Rs1 for detection and according to the offset current Iof.

The node N11 between the switch SW1 and the resistance Rs2 is coupled to an input terminal of a slope compensating circuit 23. The slope compensating circuit 23 generates a compensating signal Slp by adding a certain ramp voltage to the sense voltage Vs1, and outputs the compensating signal Slp. This compensating signal Slp is supplied to a non-inverting input terminal of a comparator 24.

An error voltage Ver according to the output voltage Vout is supplied to an inverting input terminal of the comparator 24. The output voltage Vout is supplied to a first terminal of a resistance R1 of the controlling section 20. A second terminal of the resistance R1 is coupled to a first terminal of a resistance R2, and a second terminal of the resistance R2 is coupled to the ground GND. A coupling point between the resistance R1 and the resistance R2 is coupled to an inverting input terminal of an error amplifier 25. The resistance R1 and the resistance R2 divide the output voltage Vout by their resistance ratio to generate a partial voltage Vf. The partial voltage Vf is proportionate to the output voltage Vout.

A reference voltage Vr1 is supplied by a reference power source E1 to a non-inverting input terminal of the error amplifier 25. A capacitor C2 for preventing oscillation is coupled between an output terminal and an inverting input terminal of the error amplifier 25. The error amplifier 25 outputs the error voltage Ver according to a result of amplifying the difference voltage of the partial voltage Vf and the reference voltage Vr1. The error voltage Ver is supplied to the inverting input terminal of the comparator 24.

The comparator 24 compares a voltage of the compensating signal Slp with the error voltage Ver, and outputs a signal S1 at a level corresponding to a comparison result. The comparator 24 outputs the signal S1 at an H level when the compensating signal Slp becomes equal to or higher than the error voltage Ver, and outputs the signal S1 at an L level when the compensating signal Slp becomes less than the error voltage Ver.

The output signal S1 of the comparator 24 is supplied to a flip-flop circuit 26. The flipflop circuit is for example an RS flipflop circuit. The signal S1 is supplied to a reset terminal R of the flipflop circuit 26. An oscillating signal Sck of a certain cycle output from an oscillator OSC is supplied to a set terminal S of the flipflop circuit 26. In the example of FIG. 5, the oscillating signal Sck is a pulse signal that comes to be at an H level at a certain cycle T.

The flipflop circuit 26 outputs the control signal Sp at an H level responsive to the oscillating signal Sck at the H level, and outputs the control signal Sp at an L level responsive to the signal S1 at the H level. Accordingly, the control signal Sp rises to the H level based on a rising edge of the oscillating signal Sck, and falls when the signal S1 comes to be at the H level.

The control signal Sp is supplied to drive circuits 27a, 27b. The drive circuit 27a operates for example by using the input voltage Vin as its power voltage, and outputs the drive signal DH according to the control signal Sp. The drive circuit 27b operates for example by using the input voltage Vin as its power voltage, and outputs the drive signal DL according to the control signal Sp. The drive signal DH is supplied to the control terminal (gate terminal) of the transistor T1 on a higher potential side. The drive signal DL is supplied to the control terminal (gate terminal) of the transistor T2 on a lower potential side. The transistor T1 on the higher potential side turns on or off according to the drive signal DH. The transistor T2 on the lower potential side turns on or off according to the drive signal DL.

The output section 10 includes a current detecting section 11 that detects the load current Iout flowing in the output terminal Po coupled to the external load 2. For example, the current detecting section 11 is provided between the node N1 between the transistor T1 on the higher potential side and the transistor T2 on the lower potential side and the inductor L1. The current detecting section 11 generates a sense current Is2 proportionate to the output current Iout (load current). The current detecting section 11 for example includes a resistive element inserted between the node N1 and the inductor L1, and a circuit that generates a current corresponding to a potential difference between two terminals of the resistive element.

The sense current Is2 generated by the current detecting section 11 is supplied to a switch control circuit 28. The switch control circuit 28 outputs a control signal Ss corresponding to the sense current Is2. The control signal Ss is supplied to a switch circuit 29.

The switch circuit 29 includes a common terminal coupled to a lower potential power terminal of the drive circuit 27a, a first switching terminal coupled to the ground GND, and a second switching terminal coupled to the node N2. The node N2 to which the second switching terminal is coupled is a certain node in a path for generating the output voltage Vout from the input voltage Vin (path from the input terminal Pi to the output terminal Po), and is a node with a potential lower than the power voltage (input voltage Vin) of the drive circuit 27a.

The switch circuit 29 couples the common terminal to one of the first switching terminal and the second switching terminal responsive to the control signal Ss. When the common terminal is coupled to the first switching terminal, the lower potential power terminal of the drive circuit 27a is coupled to the ground GND. On the other hand, when the common terminal is coupled to the second switching terminal, the lower potential power terminal of the drive circuit 27a is coupled to the output terminal Po.

Figure 3:
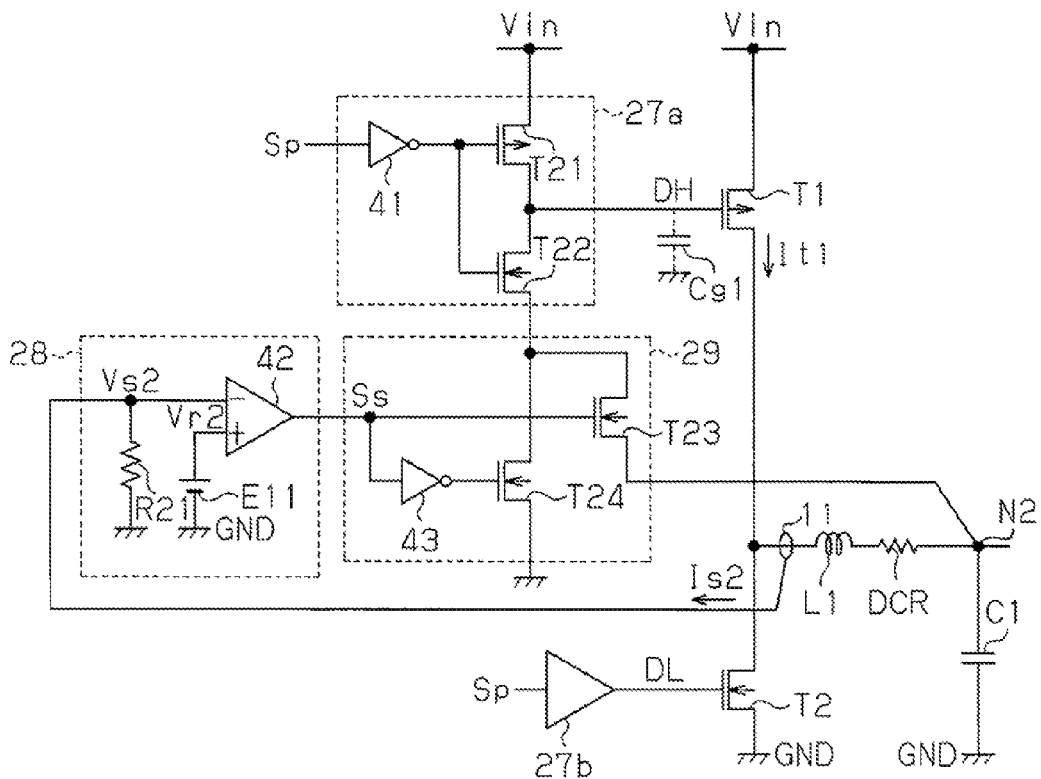
FIG. 3 is a circuit diagram of a switch circuit and a switch control circuit.

As illustrated in FIG. 3, the drive circuit 27a includes an inverter circuit 41 and transistors T21, T22. The transistor T21 is for example a P-channel MOS transistor, and the transistor T22 is for example an N-channel MOS transistor.

An input terminal of the inverter circuit 41 functions as the input terminal of the drive circuit 27a. The control signal Sp is supplied to the input terminal. An output terminal of the inverter circuit 41 is coupled to gate terminals of the transistors T21, T22. A source terminal of the transistor T21 functions as a higher potential power terminal of the drive circuit 27a, and the input voltage Vin is supplied to the higher potential power terminal as its power voltage. A drain terminal of the transistor T21 is coupled to a drain terminal of the transistor T22. A source terminal of the transistor T22 functions as the lower potential power terminal of the drive circuit 27a, and the lower potential power terminal is coupled to the switch control circuit 28. A node between the drain terminal of the transistor T21 and the drain terminal of the transistor T22 functions as an output terminal of the drive circuit 27a. The output terminal is coupled to the gate terminal of the transistor T2. In FIG. 3, a capacitor Cg1 coupled between the gate terminal of the transistor T2 and the ground GND by a broken line is a parasitic capacitance of the gate terminal of the transistor T2.

The switch control circuit 28 includes a comparator 42, a resistance R21, and a reference power E11. An inverting input terminal of the comparator 42 is coupled to a first terminal of the resistance R21, and a second terminal of the resistance R21 is coupled to the ground GND. A detection current Is2 output from the aforementioned current detecting section 11 flows to the resistance R21. Accordingly, a detection voltage Vs2 is generated from the detection current Is2 and a resistance value of the resistance R21 at the first terminal of the resistance R21. A reference voltage Vr2 by the reference power source E11 is supplied to a non-inverting input terminal of the comparator 42. The comparator 42 outputs the control signal Ss at the level corresponding to a result of comparison of the detection voltage Vs2 and the reference voltage Vr2.

The reference voltage Vr2 is set according to the output current Iout to be flown to the load 2 illustrated in FIG. 1, that is, the state of the load. The comparator 42 outputs the control signal Ss at a level corresponding to the state of the load. For example, in the light load state in which the output current Iout is less than a certain value, the detection voltage Vs2 corresponding to a multiplied value of the detection current Is2, which corresponds to the output current Iout, and the resistance R21 is lower than the reference voltage Vr2. At this occasion, the comparator 42 outputs the control signal Ss at the H level. On the other hand, in the heavy load state in which the output current Iout is greater than the certain value, the detection voltage Vs2 corresponding to the multiplied value of the detection current Is2, which corresponds to the output current Iout, and the resistance R21 is higher than the reference voltage Vr2. At this occasion, the comparator 42 outputs the control signal Ss at the L level.

The switch circuit 29 includes an inverter circuit 43 and transistors T23, T24. The transistors T23, T24 are for example N-channel MOS transistors. The control signal Ss output from the switch control circuit 28 is supplied to a control terminal (gate terminal) of the transistor T23 and an input terminal of the inverter circuit 43. A source terminal of the transistor T23 is coupled to the output node N2, and a drain terminal of the transistor T23 is coupled to the lower potential power terminal of the drive circuit 27a, that is, to the source terminal of the transistor T22. In one example, a resistance DCR serially coupled to the coil L1 is an equivalent series resistance included in the coil L1.

An output terminal of the inverter circuit 43 is coupled to a control terminal (gate terminal) of the transistor T24. The inverter circuit 43 outputs a signal Ss2 at a level that is a logical inverse of the control signal Ss. A source terminal of the transistor T24 is coupled to the ground GND. A drain terminal of the transistor T24 is coupled to the lower potential power terminal of the drive circuit 27a, that is, to the source terminal of the transistor T22.

The transistor T23 and the transistor T24 turns on and off complementarily based on the control signal Ss. The transistor T23 that turned on responsive to the control signal Ss at the H level connects the lower potential power terminal of the drive circuit 27a, that is, the source terminal of the transistor T22, to the output node N2. On the other hand, the transistor T24 that turned on responsive to the control signal Ss at the L level connects the lower potential power terminal of the drive circuit 27a, that is, the source terminal of the transistor T22, to the ground GND.

Next, an operation of the DC-DC converter 1 will be described. The error amplifier 25 outputs the error voltage Ver according to the difference voltage of the voltage Vf proportionate to the output voltage Vout and the reference voltage Vr1. The comparator 24 compares the error voltage Ver and the voltage of the compensating signal Slp, and outputs the signal S1 according to the comparison result. The flipflop circuit 26 outputs the control signal Sp at the H level according to the oscillating signal Sck, and outputs the control signal Sp at the L level according to the signal S1. Accordingly, the control signal Sp comes to be at an H level at a same cycle as the cycle T of the oscillating signal Sck, and comes to be at an L level according to the signal S1. Timing at which the control signal Sp changes by the signal S1 changes according to the difference of the output voltage Vout and the reference voltage Vr1. That is, a pulse width of the control signal Sp changes according to the output voltage Vout. Due to this, on time of the transistor T1 on the higher potential side and on time of the transistor T2 on the lower potential side change, whereby the output voltage Vout changes. As above, the DC-DC converter 1 performs feedback control so that the voltage Vf proportionate to the output voltage Vout matches the reference voltage Vr1.

Figures 5A, 5B:
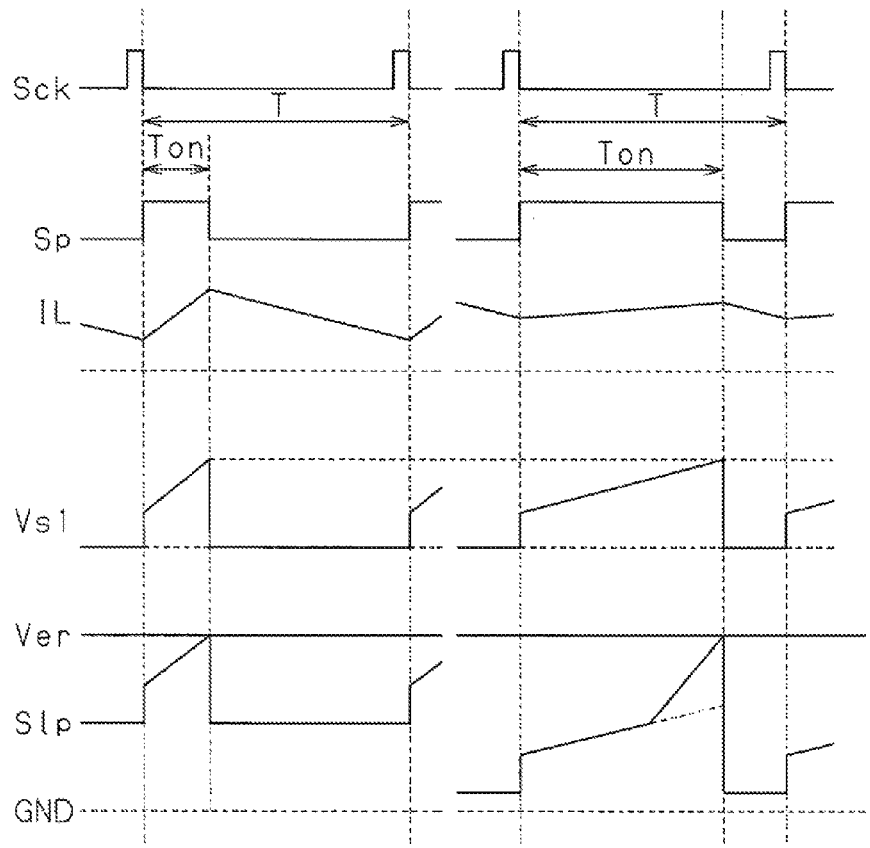
FIG. 5A and FIG. 5B are waveform diagrams of signals in the DC-DC converter.

The offset circuit 22 outputs the offset current Iof according to the difference voltage of the input voltage Vin and the output voltage Vout. FIG. 5A illustrates waveforms of signals when the on-duty is 50% or less, and FIG. 5B illustrates waveforms of the respective signals when the on-duty exceeds 50%. As above, the DC-DC converter 1 maintains the error voltage Ver at a constant value by a slope compensation by the slope compensating circuit 23 and an offset load on the sense voltage Vs1 imposed by the offset current Iof by the offset circuit 22. Due to this, the variation of the output voltage Vout is suppressed.

Figure 6A:
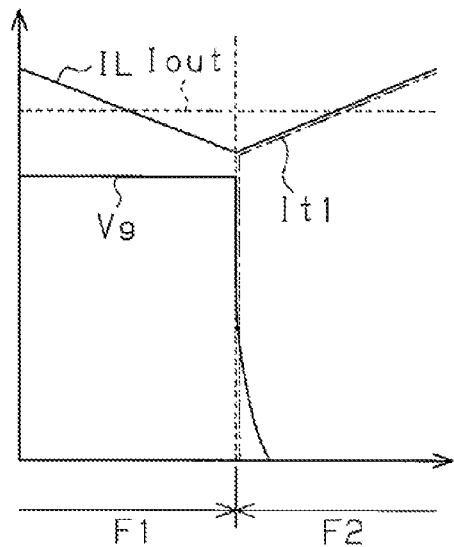
FIG. 6A and FIG. 6B are waveform diagrams of voltage and current in a control circuit.
Figure 6B:
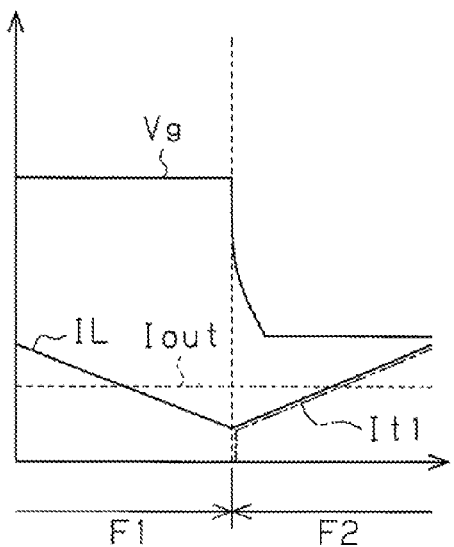

FIG. 6A illustrates waveforms of respective signals upon the heavy load state, and FIG. 6B illustrates the waveforms of the respective signals upon the light load state. In FIGS. 6A and 6B, a dot-dash line illustrates the waveform of a current It1 that flows in the transistor T1. Since a part of the actual waveform of the current It1 overlaps with other waveforms, the dot-dash line is slightly displaced from the actual waveform of the current It1 for the sake of easier understanding.

In a period F1 illustrated in FIG. 6A, the transistor T1 on the higher potential side is off, and the transistor T2 on the lower potential side is on. Further, in a period F2, the transistor T1 on the higher potential side is on, and the transistor T2 on the lower potential side is off. In the period F1, a gate voltage Vg of the transistor T1 is at the input voltage Vin level due to the transistor T21 of the drive circuit 27a illustrated in FIG. 3 being in the on-state.

During this heavy load state, the switch control circuit 28 illustrated in FIG. 3 outputs the control signal Ss at the L level, due to the detection voltage Vs2 based on the result (detection current Is2) of detecting a current IL flowing in the inductor L1 being higher than the reference voltage Vr2. The switch circuit 29 connects the lower potential power terminal of the drive circuit 27a to the ground GND responsive to the control signal Ss.

Next, in the period F2, the drive circuit 27a illustrated in FIG. 3 turns the transistor T22 on responsive to the control signal Sp. The source terminal of the transistor T22 is coupled to the ground GND via the switch circuit 29. Due to this, the gate voltage Vg of the transistor T1 on the higher potential side changes from the input voltage Vin level to the ground GND level, and the transistor T1 turns on. Since a gate-source voltage Vgs between the gate and the source of the transistor T1 becomes equal to the input voltage Vin, an on-resistance becomes substantially 0 (Ω). Due to this, an on-resistance loss in the transistor T1 is suppressed.

Similarly, in the period F1 illustrated in FIG. 6B, the transistor T1 on the higher potential side is off, and the transistor T2 on the lower potential side is on. Further, in a period F2, the transistor T1 on the higher potential side is on, and the transistor T2 on the lower potential side is off. In the period F1, the gate voltage Vg of the transistor T1 is at the input voltage Vin level due to the transistor T21 of the drive circuit 27a illustrated in FIG. 3 being in the on-state.

During this light load state, the switch control circuit 28 illustrated in FIG. 3 outputs the control signal Ss at the H level, due to the detection voltage Vs2 based on the result (detection current Is2) of detecting the current IL flowing in the inductor L1 being lower than the reference voltage Vr2. The switch circuit 29 connects the lower potential power terminal of the drive circuit 27a to the node N2 responsive to the control signal Ss.

Next, in the period F2, the drive circuit 27a illustrated in FIG. 3 turns the transistor T22 on responsive to the control signal Sp. The source terminal of the transistor T22 is coupled to the node N2 via the switch circuit 29. Due to this, the charges accumulated in a gate capacitance Cg of the transistor T1 flow to the node N2. That is, the charges accumulated in the gate capacitance Cg are supplied to the load 2 as the output current Iout. Due to this, the Qg loss due to the gate capacitance Cg is reduced.

At this occasion, since the lower potential power terminal of the drive circuit 27a is coupled to the node N2 by the switch circuit 29, the gate voltage Vg of the transistor T1 on the higher potential side changes from the input voltage Vin level to the output voltage Vout level. Accordingly, since the gate-source voltage Vgs between the gate and the source of the transistor T1 becomes equal to the difference voltage (=Vin−Vout) of the input voltage Vin and the output voltage Vout, the on-resistance becomes large. However, during this light load state, since the current It1 flowing in the transistor T1 is scarce, loss is small compared to the on-resistance loss during the heavy load state.

Next, settings upon switching a connection of the lower potential power terminal of the drive circuit 27a will be described.

Figure 7:
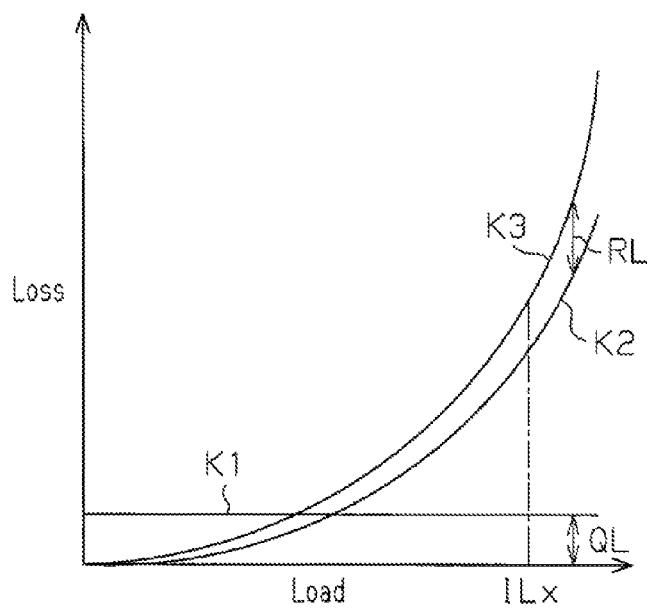
FIG. 7 is an explanatory diagram illustrating a relationship of load and loss.

Firstly, a relationship of the load and the loss will be described with reference to FIG. 7. In FIG. 7, a horizontal axis illustrates the load, and a vertical axis illustrates the loss.

A solid line K1 illustrates the Qg loss by the gate capacitance Cg of the transistor T1 on the higher potential side illustrated in FIG. 3 in a case where the input voltage Vin is constant. The Qg loss is constant regardless of the load.

A curved line K2 illustrates the loss due to the on-resistance value of the transistor T1 in a comparative example 1 in which the lower potential power terminal of the drive circuit 27a in FIG. 3 is coupled to the ground GND. The loss is a product of the on-resistance value Ron and a square of the current It1 flowing in the transistor T1 (=Ron×It1$^2$). Accordingly, the loss by the on-resistance becomes large as the load becomes larger.

A curved line K3 illustrates the loss of the on-resistance in a comparative example 2 in which the gate terminal of the transistor T1 in FIG. 3 is permanently coupled to the node N2. In the comparative example 2, the loss is generated by the on-resistance due to the gate voltage of the transistor T1 dropping only to the output voltage Vout, and the loss thereof becomes large as the load becomes larger.

The loss in the comparative example 2 is a sum value of the Qg loss illustrated by the solid line K1 and the loss by the on-resistance illustrated by the curved line K2. As in the comparative example 2, when the lower potential power terminal of the drive circuit 27a is coupled to the output node N2, the loss by the on-resistance increases whereas on the other hand the Qg loss is resolved. That is, the loss is smaller under the heavy load without taking any measures regarding the Qg loss.

Accordingly, an amount of current ILx (amount of current flowing in the inductor L1) with which an amount QL of the Qg loss and a loss increase RL by the on-resistance become equal is calculated. The light load state and the heavy load state are determined by using the amount of current ILx as a threshold, and the connection of the lower potential power terminal of the drive circuit 27a is switched according to a determination result. Due to this, a total load may be reduced.

The above determination becomes possible by converting the amount of current ILx that is used as the threshold into a voltage, and using the converted voltage as the reference voltage Vr2 in FIG. 3. An example of calculation of the reference voltage Vr2 is illustrated below.

In one example, the on-resistance value Rx1 of the transistor T1 in the comparative example 1 (that connects the lower potential power terminal of the drive circuit 27a to the ground GND) is 0.1 ($\Omega$), the on-resistance value Rx2 of the transistor T1 in the comparative example 2 (that connects the lower potential power terminal of the drive circuit 27a to the output node N2) is 0.3 ($\Omega$), a switching frequency fsw of the DC-DC converter 1 is 3 (MHz), the period Tc during which the lower potential power terminal of the drive circuit 27a is coupled to the output node N2 is 3 (ns), and the Qg loss amount QL is 15 (mW).

The loss increase RL by the on-resistance value Ron comes to be at:

$$RL = (Tc \times fsw) \times (Rx2 - Rx1) \times ILx^2$$

Accordingly, in the above example, the followings are calculated:

$$15\ mW = (3\ ns \times 3\ MHz) \times (0.3\ \Omega - 0.1\ \Omega) \times ILx^2$$

and $$ILx \approx 90\ mA$$

In the case where the resistance value of the resistance R21 illustrated in FIG. 3 is 1 (ohm), the detection voltage Vs2 becomes 90 (mV). Accordingly, by setting the reference voltage Vr2 at 90 (mV), the total loss may be reduced.

According to the first embodiment, the following advantageous effects may be achieved.

(x1-1) The switch control circuit 28 generates the control signal Ss based on the detection result of the current detecting section 11 that detects the load current flowing in the load 2 coupled to the output terminal Po. The switch circuit 29 includes the transistor T23 coupled between the lower potential power terminal of the drive circuit 27a and the node N2 that comes to be at the output voltage Vout, and the transistor T24 coupled between the aforementioned power terminal on the same potential side and the ground GND. The switch circuit 29 controls on and off of the transistor T23 and the transistor T24 complementarily based on the control signal Ss, that is, causes one of the transistors T23, T24 to be in the on-state.

With the light load having the load current Iout (coil current IL) less than a certain value, the switch control circuit 28 outputs the control signal Ss at the H level. The switch circuit 29 causes the transistor T23 to be in the on-state responsive to the control signal Ss at the H level. Due to this, the lower potential power terminal of the drive circuit 27a is coupled to the node N2. Accordingly, the charges accumulated in the parasitic capacitance Cg1 of the gate terminal of the transistor T1 are supplied to the node N2. Since the charges are included in the output voltage Vout, the charges flowing in the ground GND is reduced, whereby the loss (Qg loss) is reduced.

With the heavy load having the load current Iout (coil current IL) greater than the certain value, the switch control circuit 28 outputs the control signal Ss at the L level. The switch circuit 29 causes the transistor T24 to be in the on-state responsive to the control signal Ss at the L level. Due to this, the lower potential power terminal of the drive circuit 27a is coupled to the ground GND. Accordingly, since the voltage at the gate terminal of the transistor T1 comes to be at the ground GND level, the increase in the loss by the on-resistance of the transistor T1 may be suppressed.

(1-2) The switch control circuit 28 includes the resistance R21 in which the detection current Is2 output from the current detecting section 11 flows, and the comparator 42 that compares the detection voltage Vs2 corresponding to the product of the detection current Is2 and the resistance value of the resistance R21 with the reference voltage Vr2. The comparator 42 outputs the control signal Ss at the L level when the detection voltage Vs2 is larger than the reference voltage Vr2, and outputs the control signal Ss at the H level when the detection voltage Vs2 is smaller than the reference voltage Vr2. By configuring the switch control circuit 28 as above, the control signal Ss according to the load current flowing in the load 2 may easily be generated.

(1-3) The reference voltage Vr2 and the resistance value of the resistance R21 of the switch control circuit 28 are set according to the loss QL (Qg loss) based on the parasitic capacitance Cg1 at the gate terminal of the transistor T1 and the loss RL (loss due to the on-resistance) caused by the voltage at the gate terminal of the transistor T1 coming to be at the output voltage Vout. The respective values are set such that, with the light load having smaller loss RL due to the on-resistance than the Qg loss QL, the lower potential power terminal of the drive circuit 27a is coupled to the node N2 that is to be at the output voltage Vout, and with the heavy load having greater loss RL due to the on-resistance than the Qg loss QL, the lower potential power terminal of the drive circuit 27a is coupled to the ground GND. Due to this, the loss in the DC-DC converter 1 may be reduced.

A second embodiment will be described with reference to the attached drawings. Like reference numerals are given to those components that are the same as the corresponding components of the first embodiment. Such components will not be described in detail. Circuits and/or components that are the same as those of the first embodiment may be omitted from the respective drawings.

Figure 8:
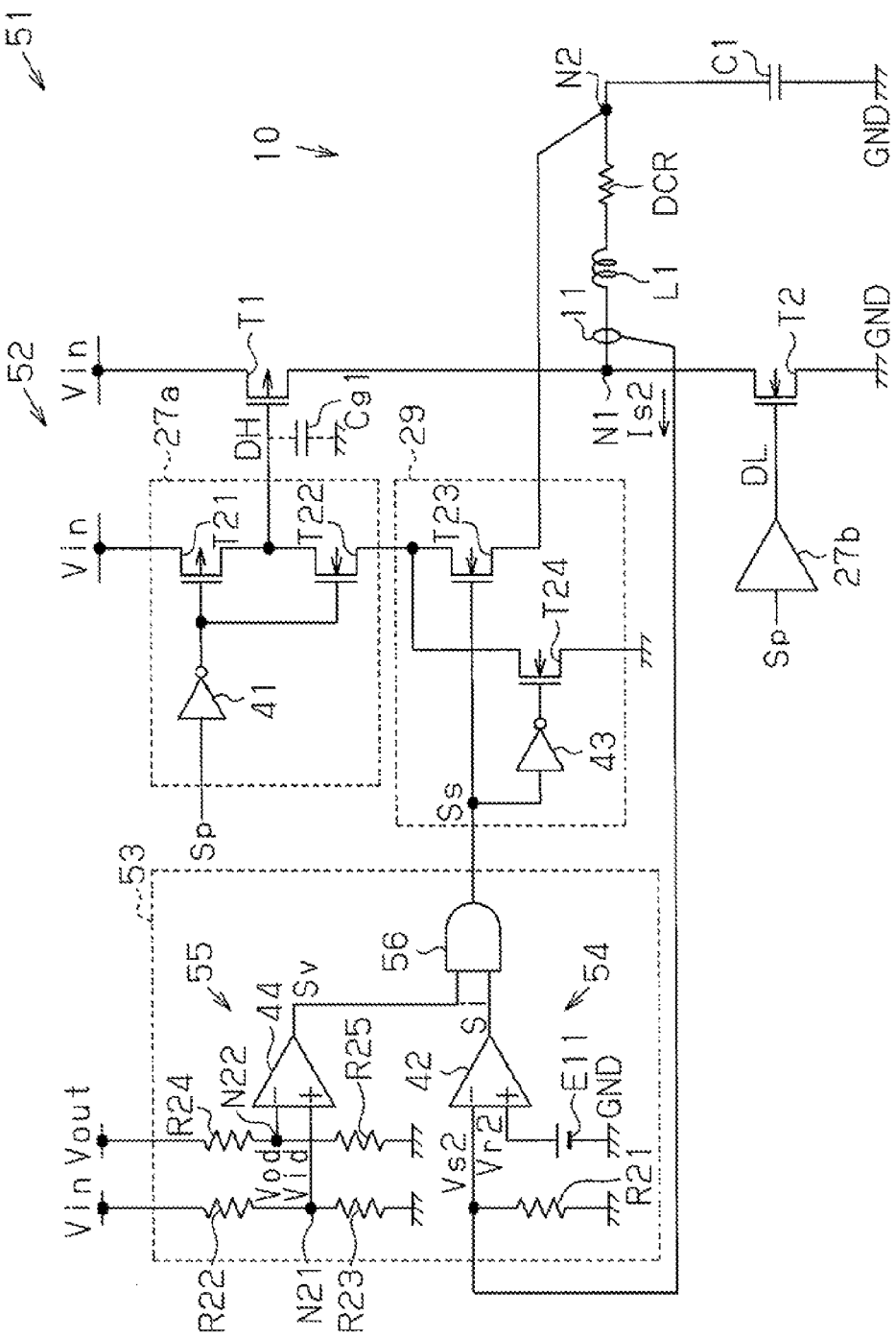
FIG. 8 is a partial circuit diagram of a DC-DC converter of a second embodiment.

As illustrated in FIG. 8, a controlling section 52 of a DC-DC converter 51 includes a switch control circuit 53 that controls a switch circuit 29 coupled to a lower potential power terminal of a drive circuit 27a. The switch control circuit 53 includes a current detecting circuit 54, a voltage detecting circuit 55, and an AND circuit 56.

The current detecting circuit 54 is configured similar to the switch control circuit 28 of the first embodiment. That is, the current detecting circuit 54 includes a comparator 42, a resistance R21 for detection, and a reference power E11. A detection voltage Vs2 according to a detection current Is2 by a current detecting section 11 is generated at a first terminal of the resistance R21. The comparator 42 outputs a current detection signal Si at a level corresponding to a result of comparison of the detection voltage Vs2 and a reference voltage Vr2.

The voltage detecting circuit 55 includes a comparator 44 and resistances R22 to R25.

An input voltage Vin is supplied to a first terminal of the resistance R22. A second terminal of the resistance R22 is coupled to a first terminal of the resistance R23, and a second terminal of the resistance R23 is coupled to a ground GND. A node N21 between the resistance R22 and the resistance R23 is coupled to a non-inverting input terminal of the comparator 44. The resistance R22 and the resistance R23 divide the input voltage Vin in accordance with the ratio of their resistance values to generate a voltage Vid.

An output voltage Vout is supplied to a first terminal of the resistance R24. A second terminal of the resistance R24 is coupled to a first terminal of the resistance R25, and a second terminal of the resistance R25 is coupled to the ground GND. A node N22 between the resistance R24 and the resistance R24 is coupled to an inverting input terminal of the comparator 44. The resistance R24 and the resistance R25 divide the output voltage Vout in accordance with the ratio of their resistance values to generate a voltage Vod.

The comparator 44 compares the voltages Vid, Vod at its both input terminals, and outputs a voltage detection signal Sv at a level corresponding to a comparison result thereof.

Resistance values of the above resistances R22 to R25 are set according to the input voltage Vin, the output voltage Vout, and a certain reference voltage Vr3 (threshold). For example, the resistance values of the resistances R22 to R25 are set such that when a difference voltage ΔV between the input voltage Vin and the output voltage Vout is equal to the reference voltage Vr3, the voltage Vid generated at the node N21 and the voltage Vod generated at the node N22 become equal to one another. Accordingly, the comparator 44 outputs the detection signal Sv at an H level when the difference voltage ΔV (=Vin−Vout) is greater than the reference voltage Vr3, and outputs the detection signal Sv at an L level when the difference voltage ΔV is smaller than the reference voltage Vr3. Setting of the reference voltage Vr3 will be described later.

The AND circuit 56 outputs a control signal Ss at a level corresponding to a result of calculating a logical product of the first detection signal Si and the second detection signal Sv. Accordingly, the AND circuit 56 outputs the control signal Ss at an L level when at least one of the first detection signal Si and the second detection signal Sv is at the L level. On the other hand, the AND circuit 56 outputs the control signal Ss at an H level when both of the first detection signal Si and the second detection signal Sv are at the H level.

The reference voltage Vr3 is set according to a loss in the DC-DC converter 51. As an comparative example, a circuit in which a lower potential power terminal of a drive circuit 27a, that is, a source terminal of a transistor T22, is directly coupled to an output node N2 will be assumed. In this comparative example, efficiency changes according to a difference voltage ΔV between an input voltage Vin and an output voltage Vout. For example, when the difference voltage ΔV of the input voltage Vin and the output voltage Vout is lower than a certain voltage, for example when it is close to zero volts, a gate voltage of a transistor T1 on a higher potential side becomes high. An on-resistance value Ron of the transistor T1 at this occasion becomes large compared to a case in which the gate voltage is at a ground GND level. Accordingly, in the comparative example, a loss caused by the on-resistance of the transistor T1 on the higher potential side becomes large.

As another comparative example, a circuit in which a lower potential power terminal of a drive circuit 27a, that is, a source terminal of a transistor T22, is coupled to a ground GND will be assumed. In the other comparative example, a loss caused by charging and discharging of a parasitic capacitance Cg of a transistor T1 on a higher potential side is generated. When a difference voltage ΔV of an input voltage Vin and an output voltage Vout becomes large, the loss by the charging and discharging becomes large.

In the second embodiment, the reference voltage Vr3 is set according to the above loss. When the difference voltage ΔV (=Vin−Vout) is larger than the reference voltage Vr3, the switch control circuit 53 outputs the control signal Ss at the level equal to the detection signal Si that the comparator 42 outputs. Due to this, similar to the first embodiment, the loss is reduced by causing one of the transistor T23 and the transistor T24 to be in an on-state according to a load current.

On the other hand, when the difference voltage ΔV (=Vin−Vout) is smaller than the reference voltage Vr3, the switch control circuit 53 outputs the control signal Ss at the L level. In receiving the control signal Ss, a transistor T24 of the switch circuit 29 turns on, and thereby the lower potential power terminal of the drive circuit 27a is coupled to the ground GND. Due to this, an increase in the loss by the on-resistance is suppressed by lowering the on-resistance value of the transistor T1 on the higher potential side.

According to the second embodiment, the following advantageous effects may be achieved in addition to the advantageous effects of the first embodiment.

(2-1) The switch control circuit 53 includes the voltage detecting circuit 55. The voltage detecting circuit 55 outputs the voltage detection signal Sv according to the difference voltage between the input voltage Vin and the output voltage Vout. The switch control circuit 53 generates the control signal Ss that controls the switch circuit 29 based on the voltage detection signal Sv and the current detection signal Si output from the current detecting circuit 54 including the comparator 42. Accordingly, the lower potential power terminal of the drive circuit 27a is coupled to the ground GND or the node N2 that is at the output voltage Vout according to the load current (output current Iout) supplied to a load 2, and the difference voltage between the input voltage Vin and the output voltage Vout. Due to this, the increase in the loss by the on-resistance during when the difference between the input voltage Vin and the output voltage Vout is small is suppressed, and the loss in the DC-DC converter 51 may be reduced.

A third embodiment will be described with reference to the attached drawings. Like reference numerals are given to those components that are the same as the corresponding components of the aforementioned embodiments. Such components will not be described in detail. Circuits and/or components that are the same as those of the aforementioned embodiments may be omitted from the respective drawings.

Figure 9:
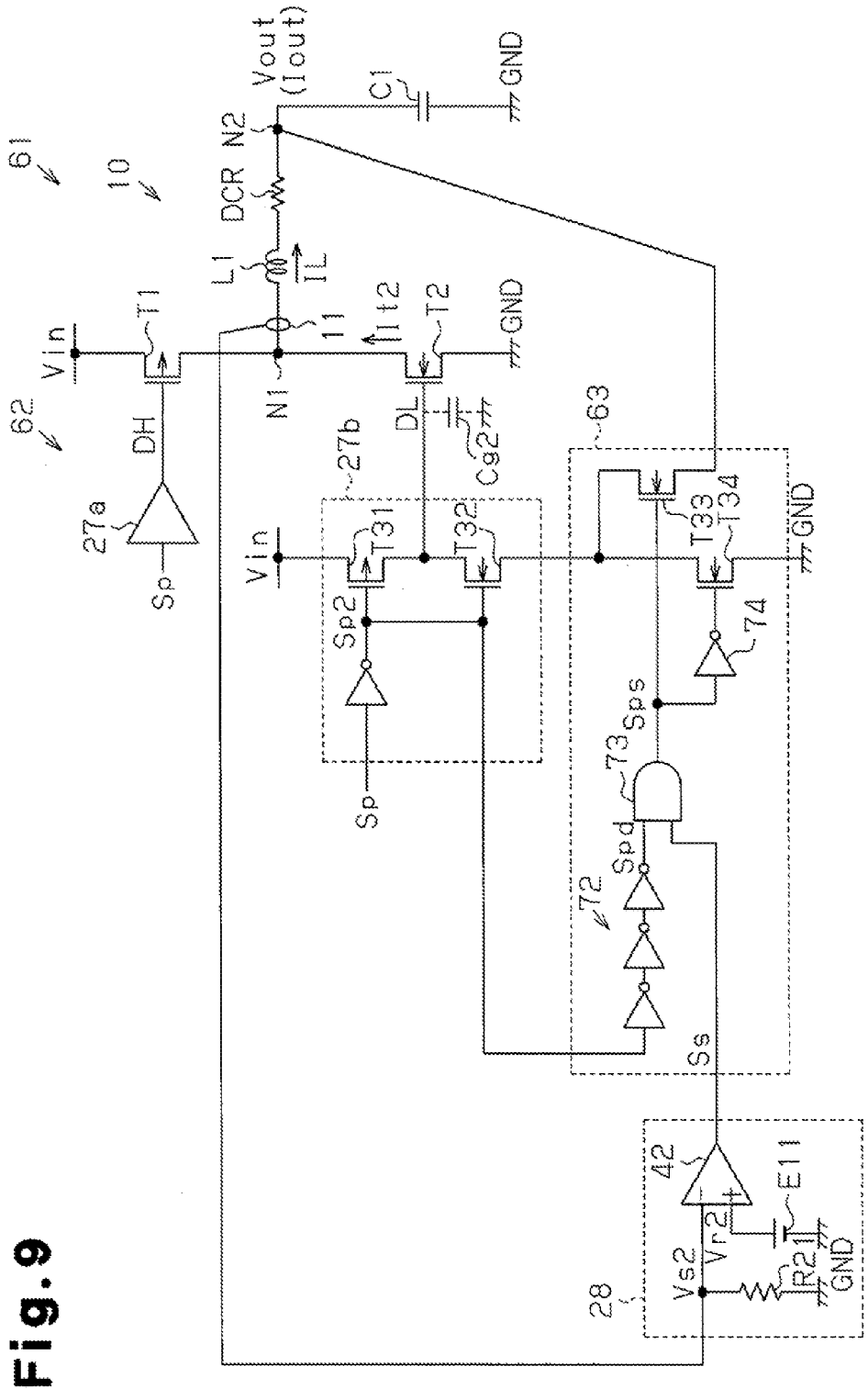
FIG. 9 is a partial circuit diagram of a DC-DC converter of a third embodiment.

As illustrated in FIG. 9, a switch control circuit 28 included in a controlling section 62 of a DC-DC converter 61 controls a switch circuit 63 coupled to a lower potential power terminal of a drive circuit 27b that drives a transistor T2 on a lower potential side. The drive circuit 27b includes an inverter circuit 71 and transistors T31, T32. The transistor T31 is for example a P-channel MOS transistor, and the transistor T32 is for example an N-channel MOS transistor.

An input terminal of the inverter circuit 71 functions as an input terminal of the drive circuit 27b. A control signal Sp is supplied to the input terminal. The inverter circuit 71 generates a signal Sp2 at a level that is a logical inverse of the control signal Sp. An output terminal of the inverter circuit 71 is coupled to gate terminals of the transistors T31, T32. A source terminal of the transistor T31 functions as a higher potential power terminal of the drive circuit 27b, and an input voltage Vin is supplied to the higher potential power terminal as its power voltage. A drain terminal of the transistor T31 is coupled to a drain terminal of the transistor T32. A source terminal of the transistor T32 functions as the lower potential power terminal of the drive circuit 27b, and the lower potential power terminal is coupled to the switch control circuit 28. A node between the drain terminal of the transistor T31 and the drain terminal of the transistor T32 functions as an output terminal of the drive circuit 27b. The output terminal is coupled to a gate terminal of the transistor T2. A capacitor Cg2 coupled between the gate terminal of the transistor T2 and the ground GND illustrated by the dashed line is a parasitic capacitance of the gate terminal of the transistor T2.

The switch circuit 63 includes a delay circuit 72, an AND circuit 73, an inverter circuit 74, and transistors T33, T34.

The delay circuit 72 is for example configured by an odd number of inverter circuits that are serially coupled. The delay circuit 72 delays the signal Sp2 from the drive circuit 27b, and outputs a delay control signal Spd at a level that is a logical inverse of the signal Sp2. Since the signal Sp2 of the drive circuit 27b is a signal that is the logical inverse of the control signal Sp, the delay control signal Spd is equivalent to a signal obtained by delaying the control signal Sp by an even number (four in the example of FIG. 9) of inverter circuits.

The AND circuit 73 generates a control signal Sds at a level according to a result of calculating a logical product of a control signal Ss output from the switch control circuit 28 and the delay control signal Spd output from the delay circuit 72. The switch control circuit 28 outputs the control signal Ss at a level according to a state of a load 2 (see FIG. 1). For example, the switch control circuit 28 outputs the control signal Ss at an H level during a light load state, and outputs the control signal Ss at an L level during a heavy load state. The AND circuit 73 outputs a control signal Sds at an L level responsive to the control signal Ss at the L level. Further, the AND circuit 73 outputs the control signal Sds at the level equal to that of the delay control signal Spd responsive to the control signal at the H level. The transistor T33 and the transistor T34 turns on and off complementarily based on the control signal Sds.

Next, an operation of the DC-DC converter 61 will be described. The switch control circuit 28 outputs the control signal Ss at the L level based on the detection result (detection current Is2) of the current detecting section 11 in the case of the heavy load. The AND circuit 73 outputs a control signal Sds at the L level responsive to the control signal Ss at the L level. Due to this, the switch circuit 63 turns the transistor T33 off, turns the transistor T34 on, and connects the lower potential power terminal of the drive circuit 27b to the ground GND.

Figure 10:
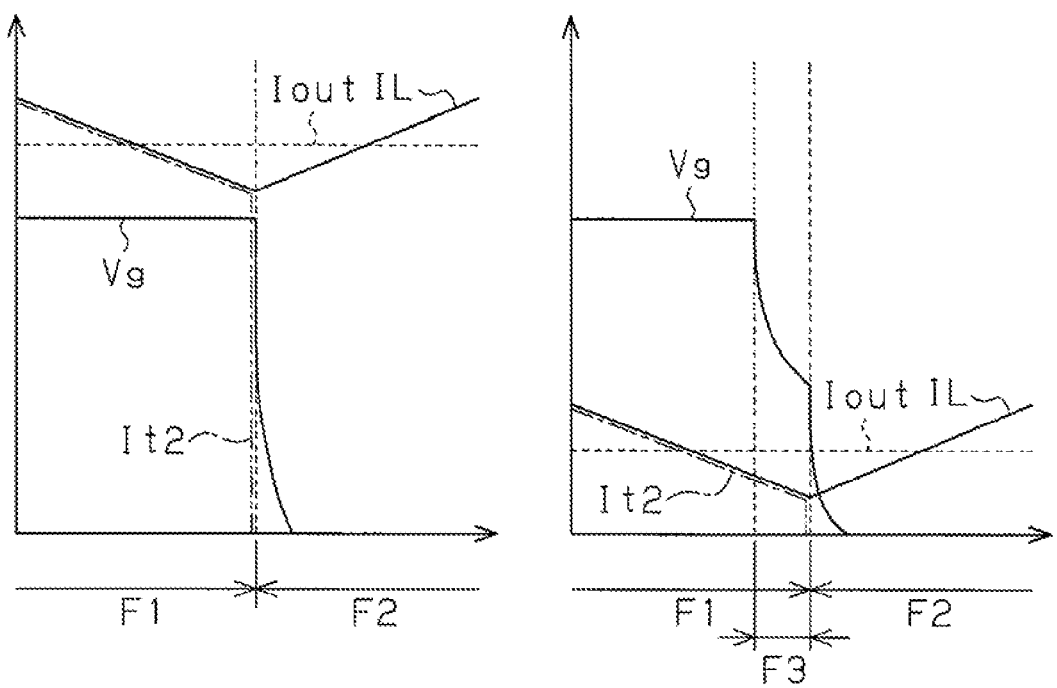
FIG. 10A and FIG. 10B are waveform diagrams of voltage and current in a control circuit.

In a period F1 illustrated in FIG. 10A, a transistor T1 on the higher potential side is off, and a transistor T2 on the lower potential side is on. Further, in a period F2, the transistor T1 on the higher potential side is on, and the transistor T2 on the lower potential side is off. In FIG. 10A, a dot-dash line illustrates a waveform of a current It2 that flows in the transistor T2. Since a part of the actual waveform of the current It2 overlaps with other waveforms, the dot-dash line is slightly displaced from the actual waveform of the current It2 for the sake of easier understanding. In the period F1, a gate voltage Vg of the transistor T2 is at the input voltage Vin level due to the transistor T31 of the drive circuit 27b illustrated in FIG. 9 being in the on-state.

During this heavy load state, the switch control circuit 28 illustrated in FIG. 9 outputs the control signal Ss at the L level, due to a detection voltage Vs2 based on a detection result (detection current Is2) of detecting a current IL flowing in an inductor L1 being higher than the reference voltage Vr2. The switch circuit 63 connects the lower potential power terminal of the drive circuit 27b to the ground GND responsive to the control signal Ss.

Next, when the period F2 takes place, the drive circuit 27b illustrated in FIG. 9 turns the transistor T32 on responsive to the control signal Sp. The source terminal of the transistor T32 is coupled to the ground GND via the switch circuit 63. Due to this, the gate voltage Vg of the transistor T2 on the lower potential side changes from the input voltage Vin level to the ground GND level, and the transistor T2 turns off. Since a gate-source voltage Vgs of the transistor T2 becomes substantially 0 (V), the on-resistance becomes substantially 0 (ohm). Due to this, an on-resistance loss in the transistor T2 is suppressed.

On the other hand, the switch control circuit 28 outputs the control signal Ss at the H level with the light load. The AND circuit 73 outputs the control signal Ss at the level equal to that of the delay control signal Spd. The delay control signal Spd is generated by the delay circuit 72 by delaying the control signal Sp (inverted signal SP2) for generating the drive signal DL that controls the on/off of the transistor T2 on the lower potential side.

The transistor T31 included in the drive circuit 27b turns on, and the transistor T32 included therein turns off based on the control signal Sp at the H level (inverted signal Sp2 at an L level). The input voltage Vin is supplied to the gate terminal of the transistor T2 via the transistor T31 in the on-state, whereby the transistor T2 turns on.

After a time according to a delay time by the delay circuit 72 elapses since the transistor T2 has turned on, the switch circuit 63 turns the transistor T33 on, and turns the transistor T34 off. Due to this, the switch circuit 63 connects the power terminal of the drive circuit 27b to the output node N2. At this occasion, the transistor T32 included in the drive circuit 27b is in the off-state based on the control signal Sp at the H level (inverted signal SP2 at the L level).

Next, the transistor T31 included in the drive circuit 27b turns off, and the transistor T32 included therein turns on based on the control signal Sp at the L level (inverted signal Sp2 at an H level). At this occasion, the power terminal of the drive circuit 27b, that is, the source terminal of the transistor T32, is coupled to the node N2 via the transistor T33 of the switch circuit 63. Accordingly, the gate terminal of the transistor T2 on the lower potential side is coupled to the output node N2 via the drive circuit 27b (transistor T32) and the switch circuit 63 (transistor T33). Due to this, the charges accumulated in the gate terminal of the transistor T2 are supplied to the output node N2. Accordingly, the gate voltage Vg of the transistor T2 drops from the input voltage Vin level, as illustrated in FIG. 10B.

Next, after a time (period F3) according to the delay time by the delay circuit 72 elapses since the transistor T32 of the drive circuit 27b has turned on, the switch circuit 63 turns the transistor T33 off, and turns the transistor T34 on. Due to this, the switch circuit 63 connects the power terminal of the drive circuit 27b to the ground GND.

As above, the gate terminal of the transistor T2 on the lower potential side is coupled to the output node N2 over a predetermined time after being turned off via the drive circuit 27b and the switch circuit 63. During this output node connecting period, the charges accumulated in the gate terminal of the transistor T2 are supplied to the output node N2. Accordingly, a Qg loss decreases.

Thereafter, the switch circuit 63 connects the power terminal of the drive circuit 27b to the ground GND. Accordingly, the gate terminal level of the transistor T2 comes to be at the ground GND level. Due to this, increase in the on-resistance of the transistor T2 is suppressed, and a current is made not to flow via the transistor T2, whereby an efficiency reduction is suppressed. That is, when a state in which the switch circuit 63 connects the power terminal of the drive circuit 27b to the output node N2 continues, the voltage at the gate terminal of the transistor T2 drops only to the output voltage Vout. That is, the source-gate voltage Vgs of the transistor T2 becomes equal to the output voltage Vout, and the on-resistance value of the transistor T2 becomes high compared to the case of causing the source-gate voltage Vgs to be at 0 (V). Due to this, the current It2 flows in the transistor T2, and the loss is generated.

According to the third embodiment, the following advantageous effects may be achieved in addition to the advantageous effects of the above embodiments.

(3-1) During the light load state, the switch circuit 63 turns the transistor T33 on according to the control signal Ss, and connects the power terminal of the drive circuit 27b to the output node N2. Due to this, the Qg loss may be reduced by supplying the charges accumulated in the parasitic capacitance Cg2 at the gate terminal of the transistor T2 to the output node N2 so as to be included in the output voltage Vout.

(3-2) During the light load state, after having caused the transistor T33 to be in the on-state, when the time according to the delay time by the delay circuit 72 elapses, the switch circuit 63 causes the transistor T34 to be in the on-state. Due to this, the gate terminal level of the transistor T2 comes to be at the ground GND level. Due to this, the increase in the on-resistance of the transistor T2 is suppressed, and the current is made not to flow via the transistor T2, whereby the efficiency reduction is suppressed.

A fourth embodiment will be described with reference to the attached drawings. Like reference numerals are given to those components that are the same as the corresponding components of the aforementioned embodiments. Such components will not be described in detail. Circuits and/or components that are the same as those of the aforementioned embodiments may be omitted from the respective drawings.

Figure 11:
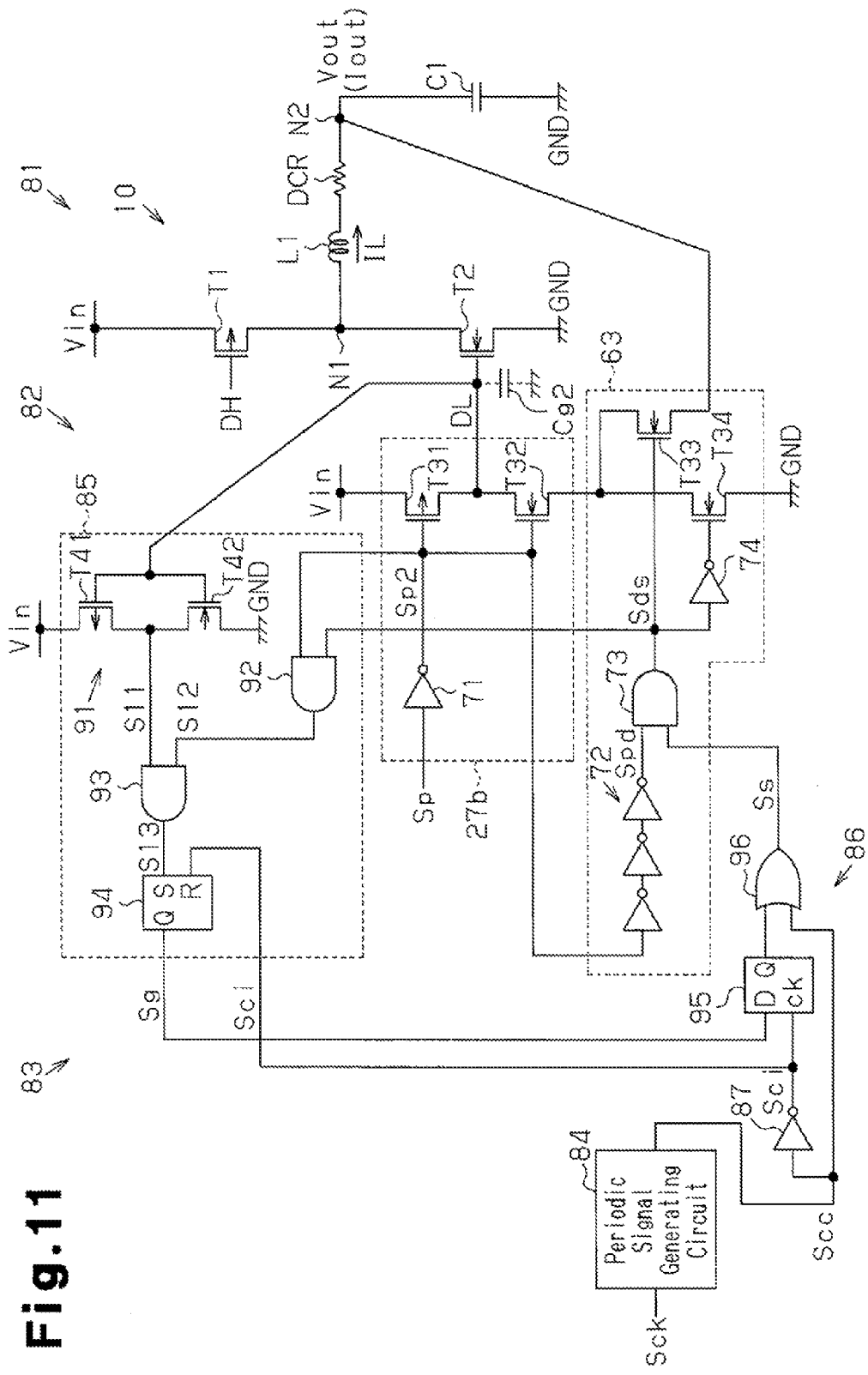
FIG. 11 is a partial circuit diagram of a DC-DC converter of a fourth embodiment.

As illustrated in FIG. 11, a switch control circuit 83 included in a controlling section 82 of a DC-DC converter 81 controls a switch circuit 63 coupled to a lower potential power terminal of a drive circuit 27b that drives a transistor T2 on a lower potential side. The switch control circuit 83 detects a state of a gate terminal of the transistor T2 on the lower potential side, and generates a control signal Ss for controlling the switch circuit 63 according to a detection result thereof. Further, the switch control circuit 83 has a function to intermittently detect the state of the gate terminal of the transistor T2 on the lower potential side.

The switch control circuit 83 includes a periodic signal generating circuit 84, a state detecting circuit 85, a control signal generating circuit 86, and an inverter circuit 87.

The periodic signal generating circuit 84 generates a periodic signal Scc indicating a period to detect the state of the gate terminal of the transistor T2 on the lower potential side. A pulse signal with a predetermined cycle T, for example, an oscillating signal Sck output from an oscillator OSC illustrated in FIG. 1 is input to the periodic signal generating circuit 84. The periodic signal generating circuit 84 is for example a counter circuit. The periodic signal generating circuit 84 counts the number of pulses of the oscillating signal Sck, that is, increments (+1) a count value responsive to the oscillating signal Sck at an H level. The periodic signal generating circuit 84 outputs the periodic signal Scc at a certain level (for example, an H level) when the count value becomes equal to a certain value (for example, "4"), and resets the count value (causes the value to be "0"). The periodic signal generating circuit 84 outputs the periodic signal Scc at an L level responsive to the next oscillating signal Sck at the H level, and increments the count value.

Figure 12:
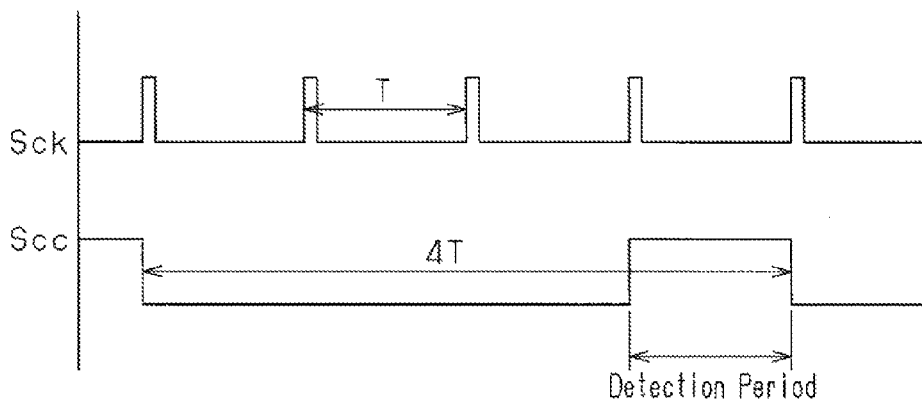
FIG. 12 is a waveform diagram of a clock signal and a periodic signal.

As illustrated in FIG. 12, the oscillating signal Sck is a signal in which the pulses are repeated at the predetermined cycle T. The cycle T of the oscillating signal Sck is a switching cycle of the DC-DC converter 81. The periodic signal Scc becomes a signal in which pulses are repeated at a cycle (4T) that is an integral multiple cycle of the oscillating signal Sck (which may be four cycles, for example). The period of the pulses at the H level is equal to one cycle of the oscillating signal Sck.

As illustrated in FIG. 11, the periodic signal Scc is supplied to the inverter circuit 87 and the control signal generating circuit 86. The inverter circuit 87 outputs an inverted periodic signal Sci at a level that is a logical inverse of the periodic signal Scc. The inverted periodic signal Sci is supplied to the state detecting circuit 85 and the control signal generating circuit 86.

The state detecting circuit 85 includes an inverter circuit 91, AND circuits 92, 93, and a flipflop circuit 94.

The inverter circuit 91 includes a P-channel MOS transistor T41 and an N-channel MOS transistor T42. An input voltage Vin is supplied to a source terminal of the transistor T41. A drain terminal of the transistor T41 is coupled to a drain terminal of the transistor T42, and a source terminal of the transistor T42 is coupled to a ground GND. Gate terminals of both of the transistors T41, T42 are coupled to the gate terminals of one another, and a gate terminal of the transistor T2 on the lower potential side. A voltage (gate terminal voltage) at the gate terminal of the transistor T2 on the lower potential side corresponds to a voltage of a drive signal DL supplied to the gate terminal of the transistor T2 and a charge amount accumulated in a parasitic capacitance Cg at the gate terminal. The inverter circuit 91 outputs a signal S11 of which level changes at timings according to changes in the gate terminal voltage.

One input terminal of the AND circuit 92 is coupled to an output terminal of the inverter circuit 71 included in the drive circuit 27b, and the other input terminal of the AND circuit 92 is coupled to an output terminal of the AND circuit 73 of the switch circuit 63. The AND circuit 92 outputs a signal S12 according to a result of calculating a logical product of an inverted control signal Sp2 and a control signal Sds.

The inverted control signal Sp2 is a signal with an inversed phase of the control signal Sp, is at an L level in a period during when the transistor T2 on the lower potential side is in an on-state, and is at an H level in a period during when the transistor T2 is in an off-state. The control signal Sds is a signal that is delayed from the control signal Sp according to a delay time by a delay circuit 72. Accordingly, the signal S12 that the AND circuit 92 outputs is a pulse signal that is at an H level in a period from when the inverted control signal Sp2 rises, that is, from when the control signal Sp drops, through the delay time of the delay circuit 72.

The transistor T2 on the lower potential side turns on or off according to the drive signal DL that is generated based on the control signal Sp. The transistor T2 on the lower potential side turns off based on the control signal Sp (drive signal DL) at an L level, that is, based on the inverted control signal Sp2 at an H level. Accordingly, the level of the signal S12 that the AND circuit 92 outputs is at an H level in a period from after the transistor T2 on the lower potential side having turned off through the delay time of the delay circuit 72. The period during which the signal S12 is at the H level corresponds to a period during when the switch circuit 63 connects the lower potential power terminal of the drive circuit 27b, that is, the gate terminal of the transistor T2 on the lower potential side, to an output node N2.

The AND circuit 93 outputs a signal S13 at a level according to a result of calculating a logical product of the output signal S11 of the inverter circuit 91 and the output signal S12 of the AND circuit 92. The output signal S11 of the inverter circuit 91 corresponds to a change in a voltage at the gate terminal of the transistor T2 on the lower potential side. The output signal S12 of the AND circuit 92 is a pulse signal that is at an H level over a predetermined period from when the transistor T2 on the lower potential side is turned off. Accordingly, the AND circuit 93 outputs the signal S13 with a waveform according to the change in the gate terminal voltage of the transistor T2 in the predetermined period after when the transistor T2 on the lower potential side is turned off.

The flipflop circuit 94 is for example an RS flipflop circuit. The signal S13 output from the AND circuit 93 is supplied to a set terminal S of the flip-flop circuit 94. The signal Sci (inverted periodic signal Sci) output from the above-mentioned inverter circuit 87 is supplied to a reset terminal R of the flip-flop circuit 94.

The flipflop circuit 94 outputs a signal Sg at an H level from an output terminal Q responsive to the signal S13 at an H level when the signal Sci is at an L level. Further, the flipflop circuit 94 outputs the signal Sg at an L level from the output terminal Q responsive to the signal Sci at an H level when the signal S13 is at an L level.

As illustrated in FIG. 12, the inverted periodic signal Sci is at the L level during a detection period, and is at the H level during a retention period. Accordingly, the flipflop circuit 94 outputs the signal Sg at the L level with the inverted periodic signal Sci at the H level, that is, during the retention period. The flipflop circuit 94 outputs the signal Sg at the level according to the signal S13 during the detection period. The signal Sg is supplied to the control signal generating circuit 86.

The control signal generating circuit 86 includes a flipflop circuit 95 and an OR circuit 96. The flipflop circuit 95 is for example a D flipflop circuit. The inverted periodic signal Sci is supplied to a clock terminal ck of the flip-flop circuit 95. The detection signal Sg output from the state detecting circuit 85 is supplied to an input terminal D of the flipflop circuit 95. The flipflop circuit 95 latches the detection signal Sg responsive to the inverted periodic signal Sci at the H level, and outputs a signal S14 at a level equal to the latched level.

The output signal S14 of the flipflop circuit 95 and the periodic signal Scc are supplied to the OR circuit 96. The OR circuit 96 outputs a control signal Ss at a level according to a result of calculating a logical sum of both signals Scc, S14.

Figure 13:
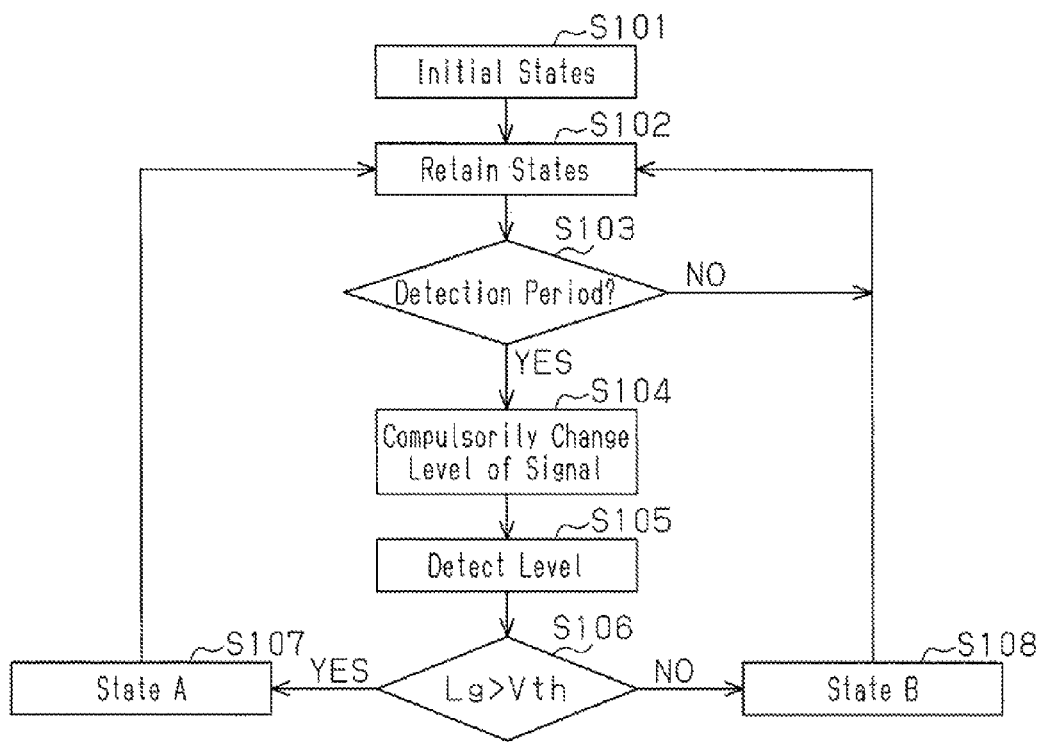
FIG. 13 is a flow chart illustrating an operation of a control circuit.

An operation of the above-mentioned switch control circuit 83 will be described with reference to FIG. 13.

Firstly, initial states of respective signals are set (step S101), and the states of the respective signals are retained (step S102).

Next, a determination is made on whether it is in the detection period or not based on the periodic signal Scc (step S103). If it is not during the detection period (periodic signal Scc at the L level), the process proceeds to step S103. That is, the state is retained. If it is in the detection period (detection signal Scc at the H level), the process proceeds to the next step.

Next, the level of the detection signal Sg is changed compulsorily (step S104). This process is performed by the inverted periodic signal Sci at the H level that is supplied to the reset terminal R of the flipflop circuit 94 illustrated in FIG. 11. That is, the detection signal Sg is reset (compulsorily changed to the L level). The control signal generating circuit 86 outputs the control signal Ss at the L level according to the detection signal Sg at the L level and the periodic signal Scc at the L level.

The switch circuit 63 switches a state in which the power terminal of the drive circuit 27b is coupled to the output node N2 (hereafter "state A") and a state in which the power terminal of the drive circuit 27b is coupled to the ground GND (hereafter "state B") according to the control signal Ss. Accordingly, the switch circuit 63 switches the connection state to the "state B" responsive to the control signal Ss at the L level.

Next, the detection period starts when the periodic signal Scc changes from the L level to the H level, and the gate voltage level of the transistor T2 on the lower potential side is detected (step S105). A detection level Lg and a threshold voltage Vth are compared. The threshold voltage Vth is a threshold voltage at which the inverter circuit 91 coupled to the gate terminal of the transistor T2 inverts the logic of the output signal S11. When the detection level Lg is greater than the threshold voltage Vth (Lg>Vth), the switch circuit 63 is set at the "state A" (step S107), and that state is retained (step S102). On the other hand, when the detection level Lg is equal to or smaller than the threshold voltage Vth (Lg≤Vth), the switch circuit 63 is set at the "state B" (step S108), and that state is retained (step S102).

Next, an operation of the switch control circuit 83 will be described with reference to FIG. 14.

Figures 14A, 14B:
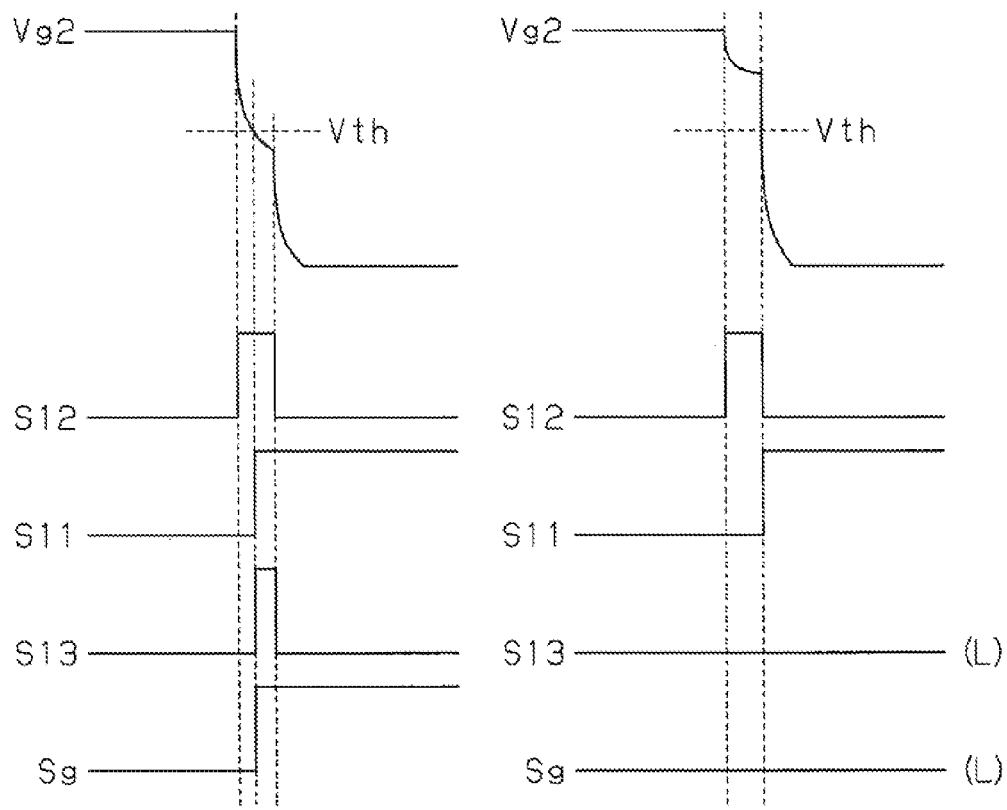
FIG. 14A and FIG. 14B are signal waveform diagrams in the control circuit.

As illustrated in FIG. 14A, the detection signal Sg is compulsorily set at the L level.

The drive circuit 27b illustrated in FIG. 11 turns on the transistor T31 responsive to the control signal Sp, and the input voltage Vin is supplied to the gate terminal of the transistor T2 on the lower potential side. Accordingly, the gate terminal voltage Vg2 of the transistor T2 comes to be at the input voltage Vin level.

The inverter circuit 91 of the state detecting circuit 85 operates by the input voltage Vin supplied to the higher potential power terminal (the source terminal of the transistor T41) and the ground GND level to which the lower potential power terminal (the source terminal of the transistor T42) is coupled. The threshold voltage Vth of the inverter circuit 91 is set at 60% of the power voltage (the potential difference between the higher potential power terminal and the lower potential power terminal), for example. Accordingly, the threshold voltage Vth of the inverter circuit 91 changes depending on the input voltage Vin.

In the case where the power terminal of the drive circuit 27b (source terminal of the transistor T32) is coupled to the output node N2, the gate voltage Vg2 of the transistor T2 drops from the input voltage Vin level to the output voltage Vout level.

In a case where the potential difference between the input voltage Vin and the output voltage Vout is large (for example, the input voltage Vin that is twice the output voltage Vout), the voltage Vg2 at the gate terminal of the transistor T2 changes from the input voltage Vin level that is higher than the threshold voltage Vth to the output voltage Vout level that is lower than the threshold voltage Vth. Due to this, the inverter circuit 91 outputs the signal S11 at the H level when the gate voltage Vg2 becomes lower than the threshold voltage Vth. The AND circuit 93 outputs the signal S13 at the H level if it receives the signal S11 at the H level during a period in which the signal S12 output from the AND circuit 92 is at the H level. The flipflop circuit 94 outputs the detection signal Sg at the H level responsive to the signal S13 at the H level.

On the other hand, in a case where the potential difference between the input voltage Vin and the output voltage Vout is small, the gate voltage Vg2 of the transistor T2 does not become lower than the threshold voltage Vth during the period in which the signal S12 is at the H level. Accordingly, the signal S13 output from the AND circuit 93 stays at the L level. Due to this, the flip-flop circuit 94 outputs the detection signal Sg at the L level.

As described above, the state detecting circuit 85 outputs the detection signal Sg at the level according to the potential difference between the input voltage Vin and the output voltage Vout. That is, the potential difference between the input voltage Vin and the output voltage Vout may be determined by the level of the detection signal Sg.

According to the fourth embodiment, the following advantageous effects may be achieved.

(4-1) The drive circuit 27b coupled to the gate terminal of the transistor T2 operates by using the input voltage Vin as its drive voltage, and turns the transistor T2 on by causing the gate terminal voltage of the transistor T2 to be at the input voltage Vin level. Accordingly, the gate terminal voltage of the transistor T2 changes from the input voltage Vin to the voltage at the node coupled to the power terminal of the drive circuit 27b. Accordingly, the gate terminal voltage of the transistor T2 changes from the input voltage Vin level to the ground GND level when the transistor T34 of the switch circuit 63 is turned on, and changes from the input voltage Vin level to the output voltage Vout level when the transistor T33 is turned on. Accordingly, the gate terminal voltage of the transistor T2 drops according to the voltage difference between the input voltage Vin and the output voltage Vout.

The state detecting circuit 85 coupled to the gate terminal of the transistor T2 generates the signal S13 according to the change in the gate voltage of the transistor T2. The flipflop circuit 94 sets the detection signal Sg by the signal S13 at the H level. That is, the potential difference between the input voltage Vin and the output voltage Vout may be determined by the level of the detection signal Sg.

(4-2) The switch control circuit 83 includes the periodic signal generating circuit 84 that generates the periodic signal Scc. The state detecting circuit 85 resets the detection signal Sg responsive to the periodic signal Scc. The control signal generating circuit 86 generates the control signal Ss so as to connect the power terminal of the drive circuit 27b to the output node N2 during the detection period responsive to the periodic signal Scc. The control signal generating circuit 86 retains the detection signal Sg responsive to the periodic signal Scc. As above, the detection of the gate terminal voltage of the transistor T2 may be performed intermittently.

The fourth embodiment may be changed as follows.

In the above fourth embodiment, the state detecting circuit 85 had set the period to detect the state of the gate terminal of the transistor T2 on the lower potential side by using the signal Sds generated by the switch circuit 63. In a similar period, other signals may be used so long as the state of the gate terminal of the transistor T2 on the lower potential side may be detected. For example, a one-shot circuit in which a signal at an H level is output for a predetermined period based on the control signal Sp, a pulse signal generating circuit in which a delay circuit and an AND circuit are combined, and the like may be used.

A fifth embodiment will be described with reference to the attached drawings. Like reference numerals are given to those components that are the same as the corresponding components of the aforementioned embodiments. Such components will not be described in detail. Circuits and/or components that are the same as those of the aforementioned embodiments may be omitted from the respective drawings.

Figure 15:
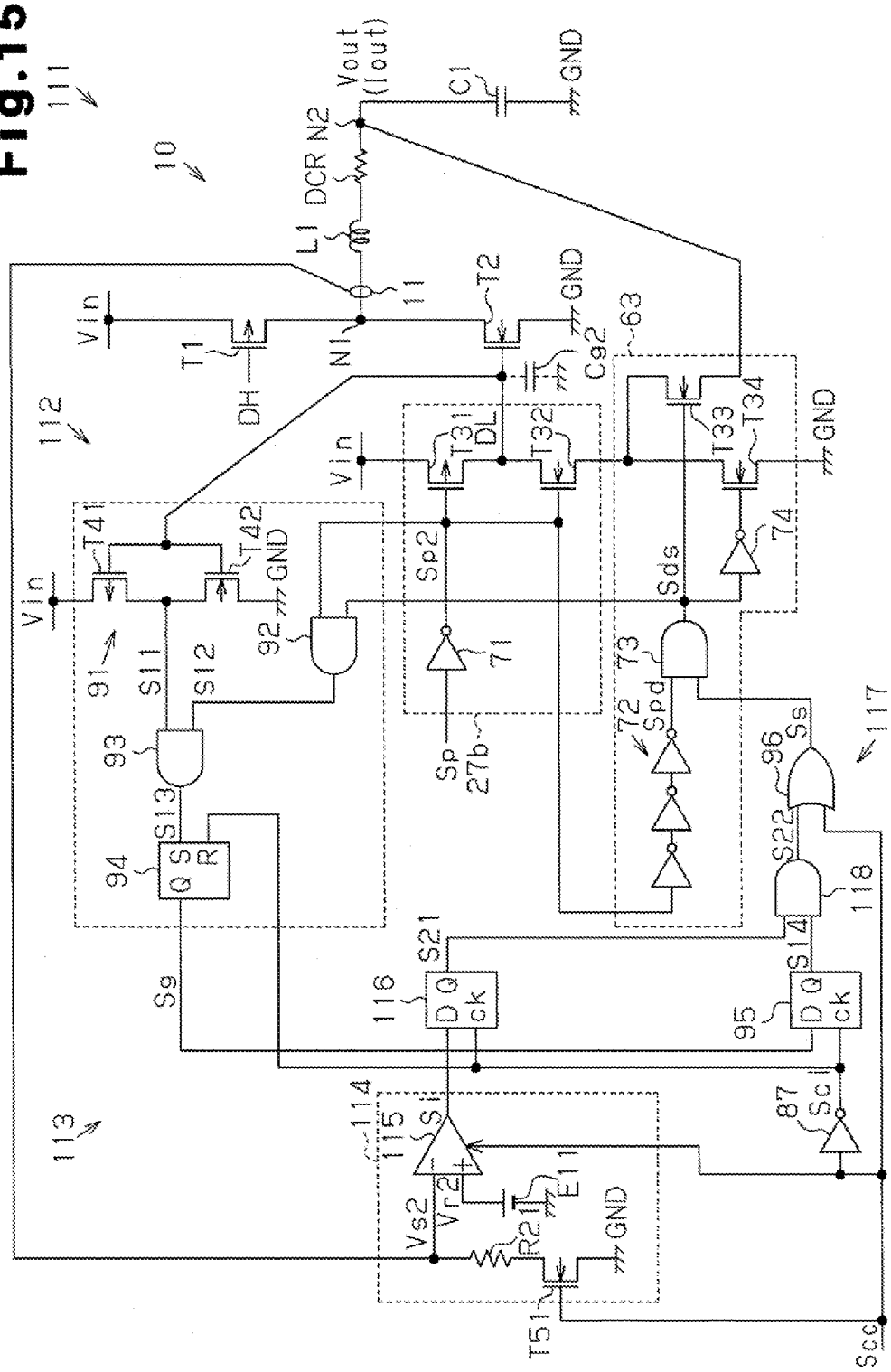
FIG. 15 is a partial circuit diagram of a DC-DC converter of a fifth embodiment.

As illustrated in FIG. 15, a switch control circuit 113 included in a controlling section 112 of a DC-DC converter 111 includes a current detecting circuit 114. The current detecting circuit 114 includes a comparator 115, a resistance R21, a transistor T51, and a reference power source E11. A first terminal of the resistance R21 is coupled to the current detecting section 11, and a second terminal of the resistance R21 is coupled to the transistor T51. The transistor T51 is for example an N-channel MOS transistor. A drain terminal of the transistor T51 is coupled to the second terminal of the resistance R21, a source terminal thereof is coupled to a ground GND, and a periodic signal Scc is supplied to a gate terminal thereof. The transistor T51 turns on responsive to the periodic signal Scc at an H level, and turns off responsive to the periodic signal Scc at an L level. When the transistor T51 turns on, a detection current Is2 flows in the resistance R21, and a detection voltage Vs2 is generated at the first terminal of the resistance R21.

The first terminal of the resistance R21 is coupled to a non-inverting input terminal of the comparator 115. A reference voltage Vr2 by the reference power source E11 is supplied to an inverting input terminal of the comparator 115. Further, the periodic signal Scc is supplied to the comparator 115. The comparator 115 operates or stops according to the periodic signal Scc. For example, the comparator 115 operates responsive to the periodic signal Scc at the H level, and stops responsive to the periodic signal Scc at the L level. During the operation, the comparator 115 outputs a detection signal Si at a level according to a result of comparison of the detection voltage Vs2 and a reference voltage Vr2. The detection signal Si is supplied to a flipflop circuit 116.

The flipflop circuit 116 is for example a D flipflop circuit. The detection signal Si is supplied to an input terminal D of the flipflop circuit 116. An inverted periodic signal Sci is supplied to a clock terminal ck of the flip-flop circuit 116. The flipflop circuit 116 latches the detection signal Si responsive to the inverted periodic signal Sci at an H level, and outputs a signal S21 at a level equal to the latched level. The signal S21 is supplied to an AND circuit 118 of a control signal generating circuit 117.

A signal S14 output from a flipflop circuit 95 is supplied to the AND circuit 118. The AND circuit 118 outputs a signal S22 at a level according to a result of calculating a logical product of the signals S14, S21. An OR circuit 96 outputs a control signal Ss at a level according to a result of calculating a logical sum of the output signal S22 of the AND circuit 118 and the periodic signal Scc.

The transistor T51 of the current detecting circuit 114 turns on or off according to the periodic signal Scc. When the transistor T51 turns on, the detection current Is2 flows in the resistance R21 that is coupled serially to the transistor T51, and the detection voltage Vs2 is generated. Since the detection current Is2 does not flow in the resistance R21 during when the transistor T51 is in an off-state, a loss is reduced thereby. The comparator 115 operates or stops according to the periodic signal Scc. Accordingly, a consumed current during when the comparator 115 stops its operation is reduced. Due to this, the loss is reduced.

According to the fifth embodiment, the following advantageous effects may be achieved in addition to the advantageous effects of the fourth embodiment.

(5-1) The comparator 115 is caused to operate during a detection period based on the periodic signal Scc. Further, the transistor T51 is turned on based on the periodic signal Scc, and the detection voltage Vs2 is generated at the resistance R21 during the detection period. Accordingly, the comparator 115 stops at a period other than the detection period, that is, during a retention period, and the detection current Is2 does not flow in the resistance R21. Due to this, low power consumption may be realized by decreasing a current shift during the retention period, that is, a consumed current is caused to be less than during the detection period.

A sixth embodiment will be described with reference to the attached drawings. Like reference numerals are given to those components that are the same as the corresponding components of the aforementioned embodiments. Such components will not be described in detail. Circuits and/or components that are the same as those of the aforementioned embodiments may be omitted from the respective drawings.

Figure 16:
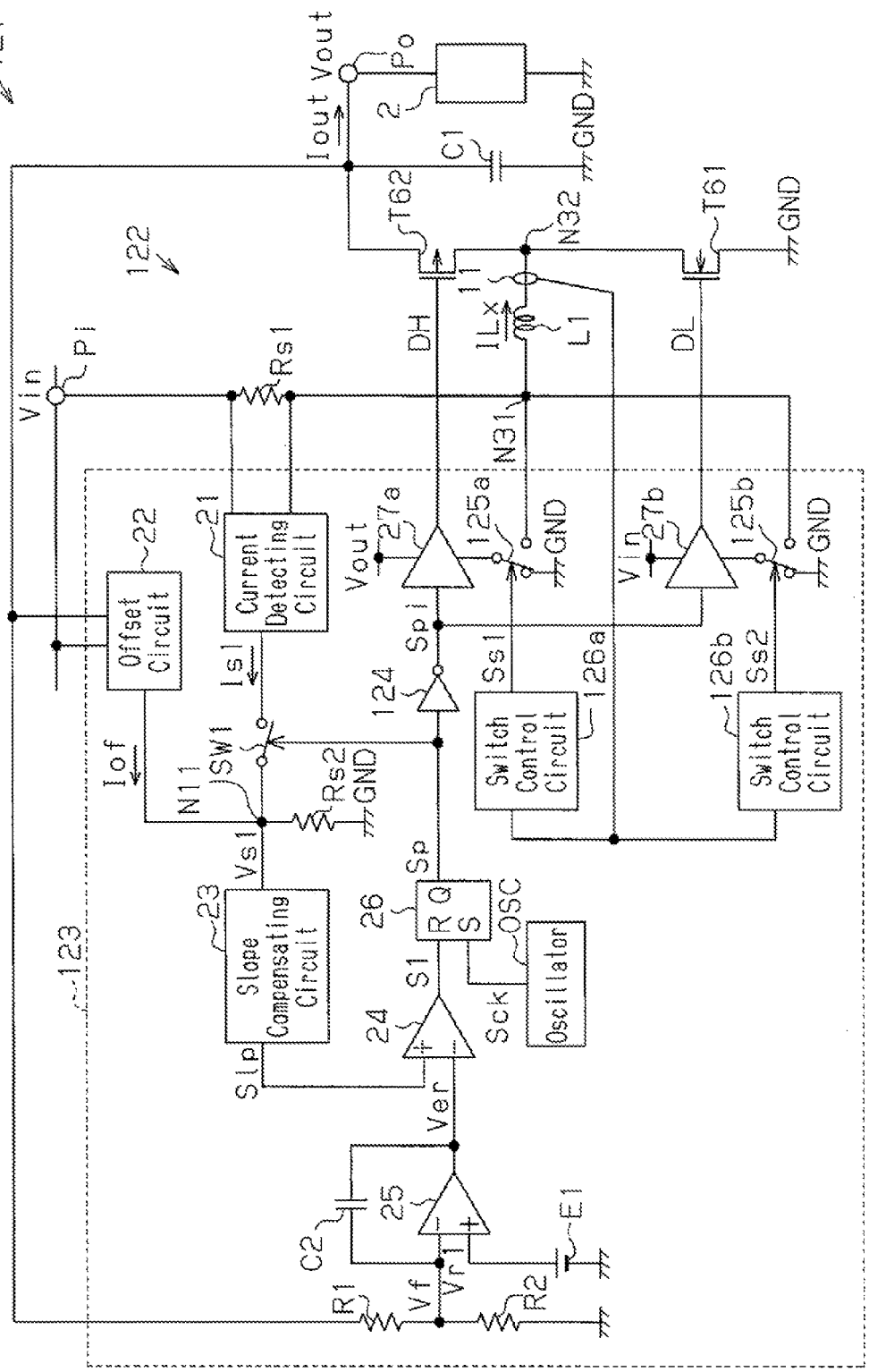
FIG. 16 is a circuit diagram of a DC-DC converter of a sixth embodiment.

A DC-DC converter 121 illustrated in FIG. 16 is a step-up DC-DC converter that employs a synchronous rectification scheme, and generates an output voltage Vout that is higher than an input voltage Vin based on the input voltage Vin that is supplied to an input terminal Pi. This output voltage Vout is supplied to a load 2 coupled to an output terminal Po.

The DC-DC converter 121 includes a converting section 122 that generates the output voltage Vout, and a controlling section 123 that controls the converting section 122.

The input voltage Vin is supplied to a first terminal of an inductor L1 via the resistance Rs1, and a second terminal of the inductor L1 is coupled to a transistor T61. The transistor T61 is for example an N-channel MOS transistor. The first terminal (source terminal) of the transistor T61 is coupled to the ground. A second terminal (drain terminal) of the transistor T61 is coupled to the second terminal of the inductor L1 and a transistor T62. The transistor T62 is for example a P-channel MOS transistor. A first terminal (source terminal) of the transistor T62 is coupled to the output terminal Po. A second terminal (drain terminal) of the transistor T62 is coupled to the second terminal of the transistor T61 and the second terminal of the inductor L1.

A drive signal DH from the controlling section 123 is supplied to a control terminal (gate terminal) of the transistor T62 on a higher potential side. The transistor T62 turns on or off according to the drive signal DH. The drive signal DL is supplied from the controlling section 123 to the control terminal (gate terminal) of the transistor T61 on a lower potential side. The transistor T61 turns on or off according to the drive signal DL.

An output terminal Q of the flipflop circuit 26 included in the controlling section 123 is coupled to an input terminal of an inverter circuit 124, and an output terminal of the inverter circuit 124 is coupled to input terminals of drive circuits 27a, 27b. The inverter circuit 124 outputs an inverted control signal Spi at a level at which a control signal Sp output from the flipflop circuit 26 is logically inverted. The drive circuit 27a operates with an output voltage Vout as its drive voltage, and outputs the drive signal DH according to the inverted control signal Spi. Accordingly, the drive circuit 27a drives the transistor T62 on the higher potential side. The drive circuit 27b operates with the input voltage Vin as its drive voltage, and outputs the drive signal DL according to the inverted control signal Spi. Accordingly, the drive circuit 27b drives the transistor T61 on the lower potential side.

A lower potential power terminal of the drive circuit 27a that drives the transistor T62 on the higher potential side is coupled to a switch circuit 125a. The switch circuit 125a is configured similar to the switch circuit 29 illustrated in FIG. 3. A common terminal of the switch circuit 125a is coupled to the power terminal of the drive circuit 27a. A first switching terminal of the switch circuit 125a is coupled to the ground GND, and a second switching terminal of the switch circuit 125a is coupled between a resistance Rs1 for detection and the inductor L1, that is, to a node N31 to which an input-side terminal of the inductor L1 is coupled. A current detecting section 11 is provided between a node N32 between the output-side terminal of the inductor L1 and the transistor T62 and the inductor L1. The switch circuit 125a connects the power terminal of the drive circuit 27a to the ground GND or the node N31 according to a control signal Ss1 output from a switch control circuit 126a.

A lower potential power terminal of the drive circuit 27b that drives the transistor T61 on the lower potential side is coupled to a switch circuit 125b. The switch circuit 125b is configured similar to the switch circuit 63 illustrated in FIG. 9. A common terminal of the switch circuit 125b is coupled to a power terminal of the drive circuit 27b, a first switching terminal is coupled to the ground GND, and a second switching terminal is coupled to the node N31. The switch circuit 125b connects the power terminal of the drive circuit 27b to the ground GND or the node N31 according to a control signal Ss2 output from a switch control circuit 126b.

The switch control circuits 126a, 126b are for example configured similar to the switch control circuit 28 illustrated in FIG. 3. Accordingly, the switch control circuit 126a detects a state of a load 2 based on a current ILx flowing in the inductor L1. The switch control circuit 126a outputs the control signal Ss1 at an H level during a light load state, and outputs the control signal Ss1 at an L level during a heavy load state. Similarly, the switch control circuit 126b outputs the control signal Ss2 at an H level during the light load state, and outputs the control signal Ss2 at an L level during the heavy load state based on the current ILx flowing in the inductor L1.

An operation of the DC-DC converter 121 will be described. The controlling section 123 of the DC-DC converter 121 turns the transistor T61 on and turns the transistor T62 off based on the control signal Sp at the H level (inverted control signal Spi at the L level) output from the flipflop circuit 26. Further, the controlling section 123 turns the transistor T61 off and turns the transistor T62 on based on the control signal Sp at the L level (inverted control signal Spi at the H level). The DC-DC converter 121 alternately repeats a state in which energy is accumulated in the inductor L1 based on the input voltage Vin and a state in which the output voltage Vout is generated based on the energy in the inductor L1. The controlling section 123 controls on-time and off-time of each of the transistors T61, T62 based on the output voltage Vout, an input current Ir detected by the detection resistance Rs1, and a difference voltage between the input voltage Vin and the output voltage Vout.

Figure 17:
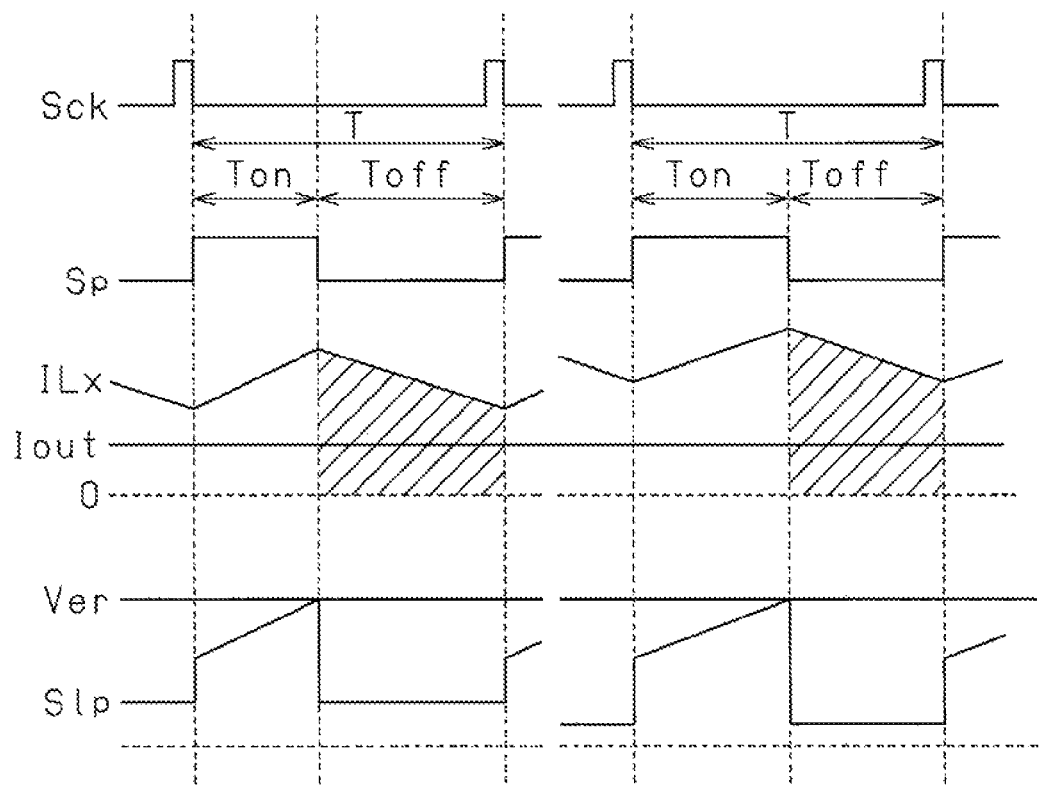
FIG. 17A and FIG. 17B are waveform diagrams of signals in the DC-DC converter.

FIG. 17A illustrates waveforms of respective signals when a duty is 25%, and FIG. 17B illustrates waveforms of the respective signals when the duty is 50%. Accordingly, the DC-DC converter 121 maintains an error voltage Ver at a constant value by a slope compensation by a slope compensating circuit 23 and an offset load to a sense voltage Vs1 by the offset current Iof by the offset circuit 22. Due to this, the variation of the output voltage Vout is suppressed.

In a heavy load state, the switch circuit 125a connects the power terminal of the drive circuit 27a to the ground GND responsive to the control signal Ss1 at the H level. The switch circuit 125b connects the power terminal of the drive circuit 27b to the ground GND responsive to the control signal Ss2 at the H level. By causing the lower potential power terminals of the drive circuits 27a, 27b to be coupled to the ground GND, on-resistance values of the transistors T62, T61 are prevented from becoming large, and a loss caused by the on-resistances is reduced.

In a light load state, the switch circuit 125a connects the power terminal of the drive circuit 27a to the node N31 responsive to the control signal Ss1 at the L level. The switch circuit 125b connects the power terminal of the drive circuit 27b to the node N31 responsive to the control signal Ss2 at the L level. Accordingly, by causing the lower potential power terminals of the drive circuits 27a, 27b to be coupled to the node N31, charges of parasitic capacitances of gate terminals of the transistors T62, T61 are supplied to an input side of the inductor L1, whereby a loss caused by the gate capacitances is reduced.

According to the sixth embodiment, the following advantageous effects may be achieved.

(6-1) In the step-up DC-DC converter 121, a loss (Qg) caused by the parasitic capacitances at the gate terminals of the transistors T61, T62 may be reduced. Further, an increase in the loss caused by the on-resistances of the transistors T61, T62 being increased may be suppressed. Accordingly, in the step-up DC-DC converter 121, conversion efficiency may be improved.

The sixth embodiment may be modified to embodiments as follows.

Configurations of the switch control circuits 126a, 126b may suitably be changed. For example, the configuration of the switch control circuit 126a may be configured similar to the switch control circuit 53 illustrated in FIG. 8. Further, the configuration of the switch control circuit 126b may be configured similar to the switch control circuit 83 illustrated in FIG. 11, or to the switch control circuit 113 illustrated in FIG. 15.

The switch circuit coupled to the lower potential power terminal of one of the two drive circuits 27a, 27b, and the control circuit that controls the aforementioned switch circuit may be omitted.

A seventh embodiment will be described with reference to the drawings. Like reference numerals are given to those components that are the same as the corresponding components of the aforementioned embodiments. Such components will not be described in detail. Circuits and/or components that are the same as those of the aforementioned embodiments may be omitted from the respective drawings.

Figure 18:
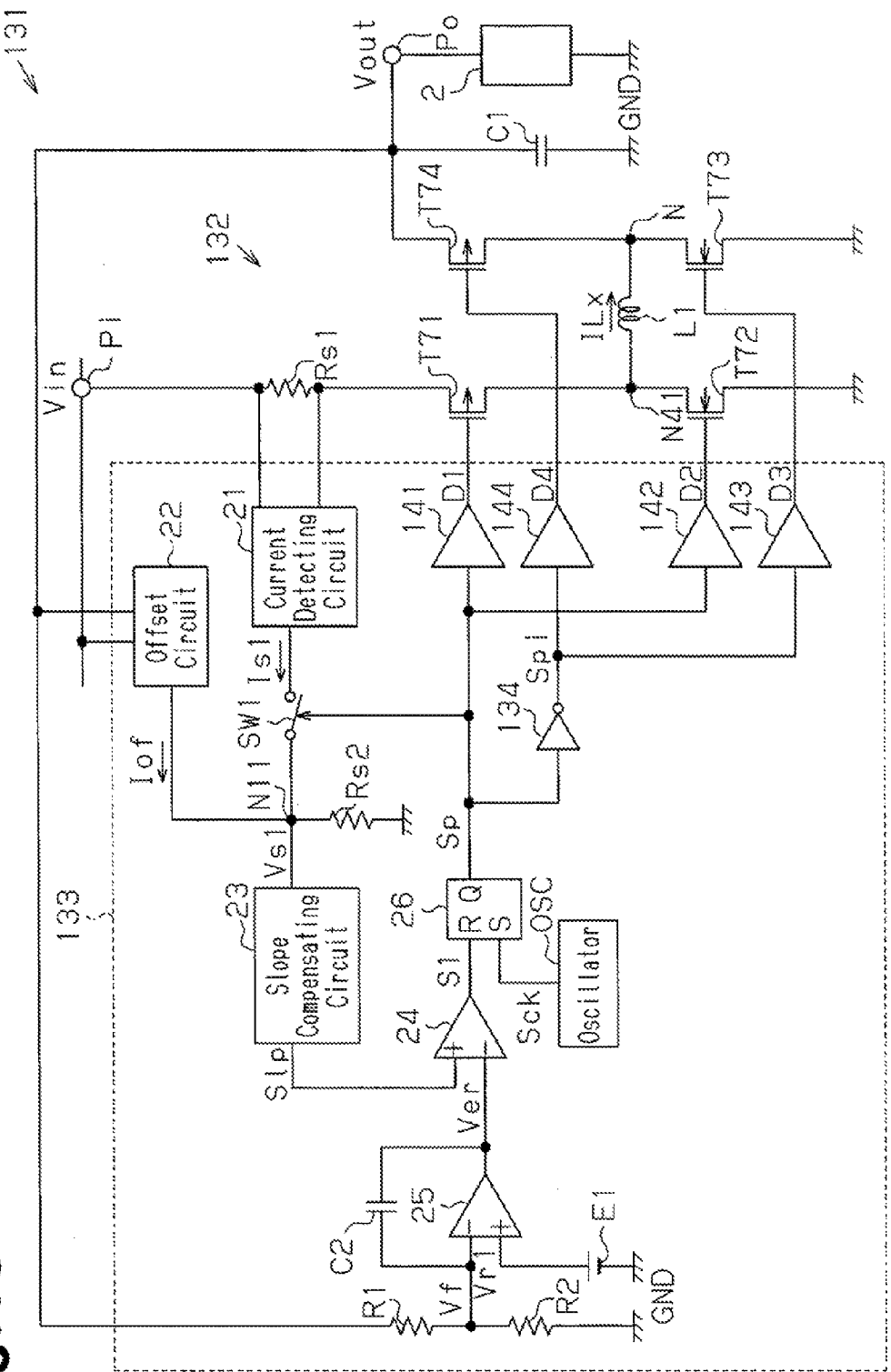
FIG. 18 is a circuit diagram of a DC-DC converter of a seventh embodiment.

A DC-DC converter 131 illustrated in FIG. 18 is a step-up-and-down type converter, and generates an output voltage Vout based on an input voltage Vin supplied to an input terminal Pi. This output voltage Vout is supplied to a load 2 coupled to an output terminal Po.

The DC-DC converter 131 includes a converting section 132 that generates the output voltage Vout, and a controlling section 133 that controls the converting section.

The converting section 132 includes transistors T71 to T74, an inductor L1, and a capacitor C1. The transistors T71, T74 are for example P-channel MOS transistors, and the transistors T72, T73 are for example N-channel MOS transistors.

The input voltage Vin is supplied to a first terminal (source terminal) of the transistor T71 via a resistance Rs1. A second terminal (drain terminal) of the transistor T71 is coupled to a second terminal (drain terminal) of the transistor T72, and a first terminal (source terminal) of the transistor T72 is coupled to a ground GND. An intermediate node N41 between the second terminal of the transistor T71 and the second terminal of the transistor T72 is coupled to a first terminal of the inductor L1, and a second terminal of the inductor L1 is coupled to a second terminal (drain terminal) of the transistor T73. A first terminal (source terminal) of the transistor T73 is coupled to the ground GND. The second terminal of the inductor L1 is coupled to a second terminal (drain terminal) of the transistor T74. A first terminal (source terminal) of the transistor T74 is coupled to the output terminal Po. The output terminal Po is coupled to a first terminal of the smoothing capacitor C1, and a second terminal of the capacitor C1 is coupled to the ground GND. Each of the transistors T71 to T74 turns on or off according to corresponding one of drive signals D1 to D4 output from a controlling section 133.

A control signal Sp output from an output terminal Q of a flip-flop circuit 26 included in the controlling section 133 is supplied to first and second drive circuits 141, 142. The first drive circuit 141 generates the drive signal D1 for driving the first transistor T71 responsive to the control signal Sp. The second drive circuit 142 generates the drive signal D2 for driving the second transistor T72 responsive to the control signal Sp.

The control signal Sp is supplied to the inverter circuit 134, and the inverter circuit 134 outputs an inverted control signal Spi at a level that is a logical inverse of the control signal Sp. The inverted control signal Spi is supplied to third and fourth drive circuits 143, 144. The third drive circuit 143 generates the drive signal D3 for driving the third transistor T73 responsive to the inverted control signal Spi. The fourth drive circuit 144 generates the drive signal D4 for driving the fourth transistor T74 responsive to the inverted control signal Spi.

A schematic operation of the DC-DC converter 131 will be described.

The controlling section 133 of the DC-DC converter 131 turns the transistors T71, T73 on based on the control signal Sp at an H level output from the flipflop circuit 26, and turns the transistors T72, T74 off based on the inverted control signal Spi at an L level. Further, the controlling section 133 turns the transistors T71, T74 off based on the control signal Sp at an L level, and turns the transistors T72, T73 on based on the inverted control signal Spi at an H level. The DC-DC converter 131 alternately repeats a state in which energy is accumulated in the inductor L1 based on the input voltage Vin and a state in which the output voltage Vout is generated based on the energy in the inductor L1. The controlling section 133 controls on-time and off-time of each of the transistors T71 to T74 based on the output voltage Vout, an input current Ir detected by the detection resistance Rs1, and a difference voltage between the input voltage Vin and the output voltage Vout.

Figure 21:
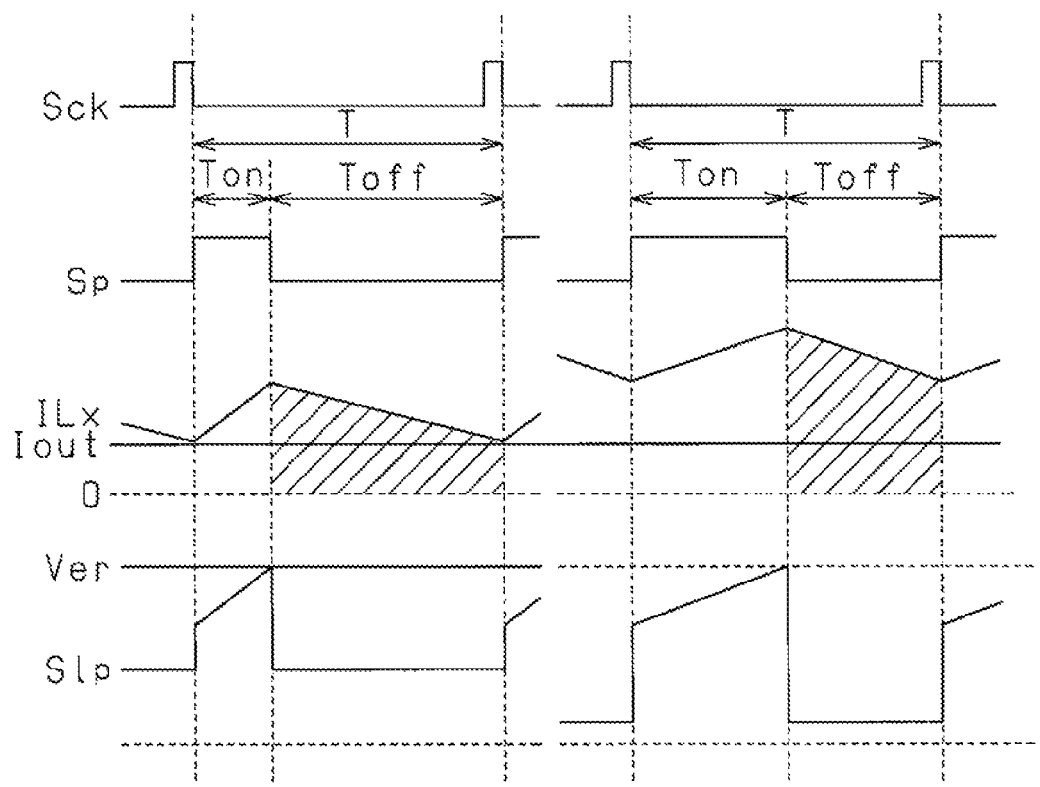
FIG. 21A and FIG. 21B are waveform diagrams of signals in the DC-DC converter.

FIG. 21A illustrates waveforms of respective signals when a duty is 40%, and FIG. 21B illustrates waveforms of the respective signals when the duty is 50%. Accordingly, the DC-DC converter 131 maintains an error voltage Ver at a constant value by a slope compensation by a slope compensating circuit 23 and an offset load to a sense voltage Vs1 by the offset current Iof by the offset circuit 22. Due to this, the variation of the output voltage Vout is suppressed.

Figure 19:
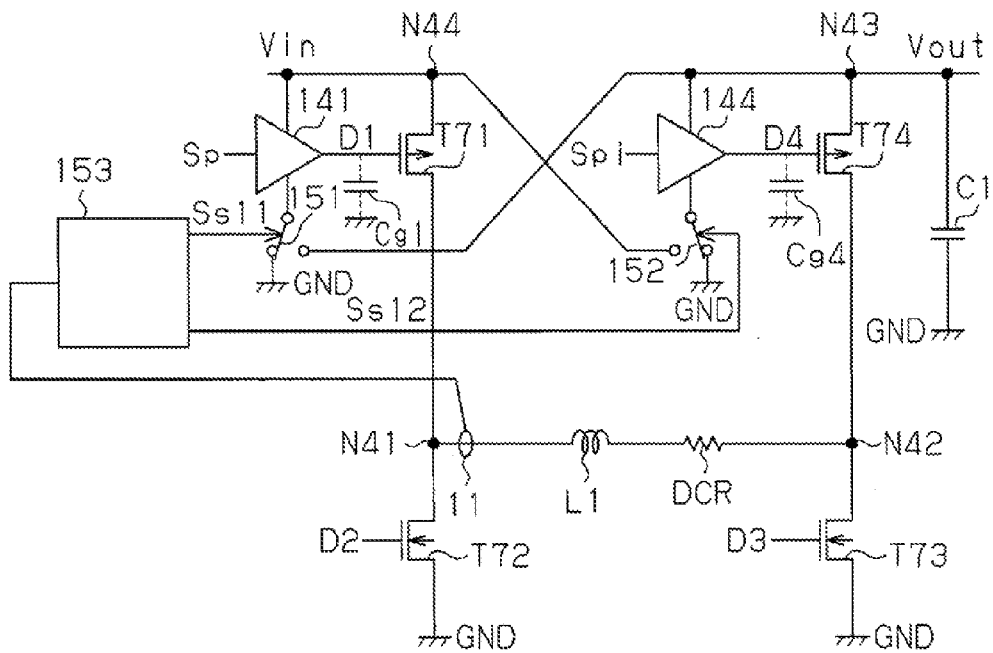
FIG. 19 is a partial circuit diagram of the DC-DC converter of the seventh embodiment.

Further, the DC-DC converter 131 includes switch circuits 151, 152 and a switch control circuit 153 illustrated in FIG. 19. The switch circuit 151 is coupled to a lower potential power terminal of the first drive circuit 141, and the input voltage Vin is supplied to a higher potential power terminal of the first drive circuit 141. The switch circuit 151 is configured similar to the switch circuit 29 illustrated in FIG. 3. The switch circuit 151 connects a power terminal of the drive circuit 141 to a ground GND or to a node N43 based on a control signal Ss11 output from the switch control circuit 153.

The switch circuit 152 is coupled to a lower potential power terminal of the fourth drive circuit 144, and the output voltage Vout is supplied to a higher potential power terminal of the fourth drive circuit 144. The switch circuit 152 is configured similar to the switch circuit 63 illustrated in FIG. 9. The switch circuit 152 connects a power terminal of the drive circuit 144 to the ground GND or a node N44 according to a control signal Ss12 output from the switch control circuit 153. The node N44 is a node between the input terminal Pi and a source terminal of the first transistor T71 illustrated in FIG. 18.

The switch control circuit 153 is for example configured similar to the switch control circuit 53 illustrated in FIG. 8. The switch control circuit 153 outputs the control signals Ss11, Ss12 according to a state of a load 2 (see FIG. 18) based on a detection result (detection current Is2) of a current detecting section 11 provided between the node N41 and the inductor L1. For example, the switch control circuit 153 outputs the control signals Ss11, Ss12 at the H level upon a light load state, and outputs the control signals Ss11, Ss12 at the L level upon a heavy load state.

In the heavy load state, the switch circuit 151 connects the power terminal of the drive circuit 141 to the ground GND responsive to the control signal Ss11 at the H level. The switch circuit 152 connects the power terminal of the drive circuit 144 to the ground GND responsive to the control signal Ss12 at the H level. Accordingly, by causing the lower potential power terminals of the drive circuits 141, 144 to be connected to the ground GND, on-resistance values of the transistors T71, T74 are prevented from becoming large, and a loss caused by the on-resistances is reduced.

In the light load state, the switch circuit 151 connects the power terminal of the drive circuit 141 to the node N43 responsive to the control signal Ss11 at the L level. The switch circuit 152 connects the power terminal of the drive circuit 144 to the node N44 responsive to the control signal Ss12 at the L level. Accordingly, by causing the lower potential power terminals of the drive circuits 141, 144 to be coupled to the nodes N43, N44, charges of parasitic capacitances Cg1, Cg4 of gate terminals of the transistors T71, T74 are supplied to an input side or an output side. Accordingly, a loss caused by the gate capacitances Cg1, Cg4 is reduced.

According to the seventh embodiment, the following advantageous effects may be achieved.

(7-1) In the step-up-and-down DC-DC converter 131, a loss (Qg) caused by the parasitic capacitances at the gate terminals of the transistors T71, T74 may be reduced. Further, an increase in the loss caused by the on-resistances of the transistors T71, T74 being increased may be suppressed. Accordingly, in the step-up DC-DC converter 121, conversion efficiency may be improved.

The seventh embodiment may be modified as follows.

Control of the transistors T71 to T74 included in the converting section 132 may suitably be changed. For example, the control may be performed according to a magnitude relationship and a potential difference of the input voltage Vin and the output voltage Vout. For example, in a case where the input voltage Vin is higher than the output voltage Vout and their potential difference is large, the controlling section may control the converting section to generate the output voltage Vout that is reduced from the input voltage Vin. In such a control, the third transistor T73 may be fixed at an off-state, and the fourth transistor T74 may be fixed at an on-state. Further, in a case where the input voltage Vin is lower than the output voltage Vout and their potential difference is large, the controlling section may fix the first transistor T71 at an on-state and the second transistor T72 at an off-state so as to generate the output voltage Vout that is increased from the input voltage Vin.

Figure 20:
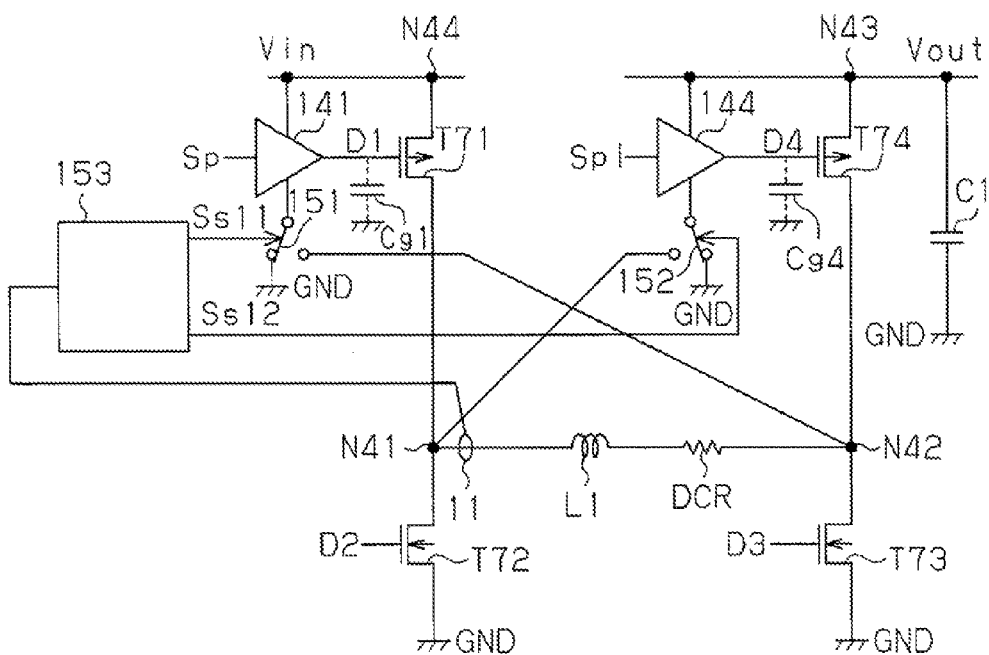
FIG. 20 is a partial circuit diagram of another DC-DC converter.

In performing the control as above, as illustrated in FIG. 20, connection destinations of the power terminals of the drive circuits 141, 144 are respectively set to be the nodes N42, N41. Since the node N41 is not coupled to the ground GND due to the second transistor T72 being fixed at the off-state, the charges accumulated at the gate capacitance Cg4 of the transistor T74 are used by the output voltage Vout, and no loss is generated. Similarly, since the node N42 is not coupled to the ground GND due to the third transistor T73 being fixed at the off-state, the charges accumulated at the gate capacitance Cg1 of the transistor T71 are used by the output voltage Vout, and no loss is generated. Further, the resistance value of the fourth transistor T74 in the on-state and a capacitor C1 function as a filter. Due to this, ripples of the output voltage Vout may be reduced.

The configuration of the switch control circuit 153 may for example be configured similar to the switch control circuit 28 illustrated in FIG. 3. Further, the configuration of the switch control circuit 153 may be configured similar to the switch control circuit 83 illustrated in FIG. 11, or to the switch control circuit 113 illustrated in FIG. 15.

A switch circuit may be coupled to the lower potential power terminal of at least one drive circuit among the drive circuits 142, 143 (see FIG. 18) that drive the transistors T72, T73 on a lower potential side. The configuration of the switch circuit may for example have a similar configuration as the switch circuit 63 illustrated in FIG. 9. The power terminal may be coupled to the ground GND or an appropriate node by the switch circuit. A switch control circuit may suitably be configured such as the switch control circuit 28 illustrated in FIG. 9, the switch control circuit 83 illustrated in FIG. 11, the switch control circuit 113 illustrated in FIG. 15 and the like.

It should be apparent to those skilled in the art that the present invention may be embodied in many other specific forms without departing from the scope of the invention. Particularly, it should be understood that the present invention may be embodied in the following forms.

In the above embodiments, the lower potential power terminal of the drive circuit that drives the MOS transistors is coupled to the ground GND or the certain node (for example, output node) according to the state of the load. A switching element thereof is not limited to the above-described MOS transistors, and may be an element that turns on or off according to a charge amount at a control terminal.

In the above embodiments, conductive types of the transistors may suitably be changed. For example, in the DC-DC converter 1 illustrated in FIG. 1, the transistors T1, T2 may be changed to N-channel MOS transistors, and the transistors T1, T2 may be changed to P-channel MOS transistors. Logics of the control signals supplied to the drive circuits according to the conductive types of the transistors may suitably be changed.

The above embodiments discuss circuitry examples for generating the control signal Sp to be supplied to the drive circuits 27a, 27b and the like, however, configurations of the circuits may suitably be changed. For example, the offset circuit 22 may be omitted. The circuit from the resistance Rs1 for sensing to the comparator 24 may be omitted, and the output signal of the error amplifier 25 may be supplied to the reset terminal R of the flipflop circuit 26.

In the above embodiments, the DC-DC converters employ a synchronous rectification scheme, however, an asynchronous rectification scheme may be employed instead. For example, instead of the transistor T2 in the DC-DC converter 1 illustrated in FIG. 1, a diode in which an anode is coupled to the ground GND and a cathode is coupled to the node N1 may be used. A diode may be used instead of the transistor T62 in the DC-DC converter 121 illustrated in FIG. 16. At least one of the transistors T72, T74 in the DC-DC converter 131 illustrated in FIG. 18 may be changed to a diode. Voltages may be applied to the control terminals (gates) of the respective transistors T2, T62, T72, T74 so that they function as diodes.

In the above embodiments, the delay circuit 72 and the AND circuit 73 included in the switch circuit 63 coupled to the drive circuit 27b that drives the transistor T2 on the lower potential side may be included in the control circuit. In this case, the output signal from the AND circuit 73 becomes the control signal for controlling the transistors T33, T34. Further, the inverter circuits 43, 74 included respectively in the switch circuits 29, 63 may be included in the corresponding control circuit.

Figure 22:
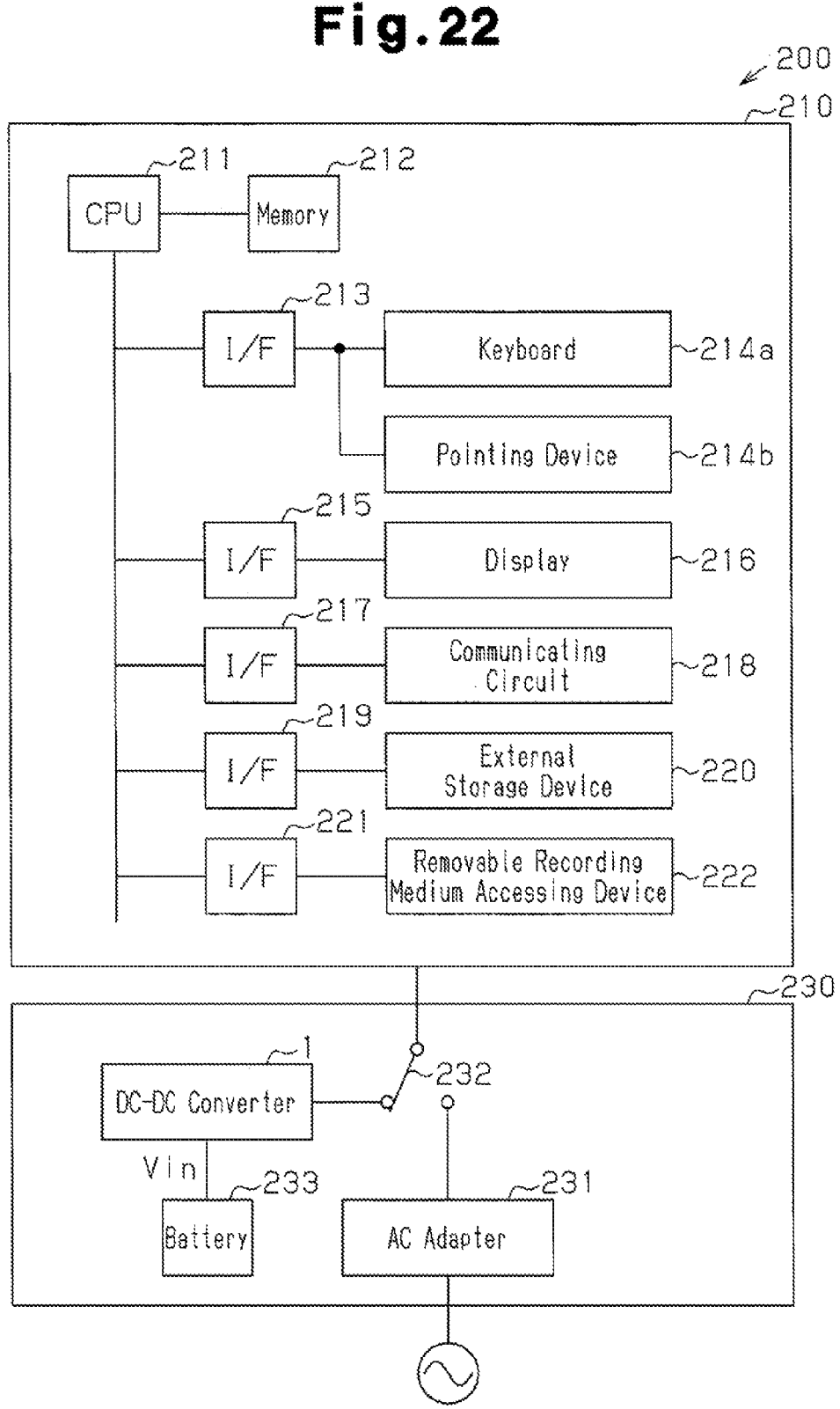
FIG. 22 is a schematic diagram of an electronic device.

FIG. 22 illustrates an example of an electronic device 200 that includes the above-described DC-DC converter 1. The electronic device 200 includes a main body section 210, and a power source section 230 that supplies power to the main body section 210.

Firstly, an example of an internal configuration of the main body section 210 will be described. A central processing unit (CPU) 211 that executes programs has a memory 212 coupled thereto. The memory 212 stores the programs to be executed by the CPU 211 or data to be processed by the CPU 211. Further, the CPU 211 has a keyboard 214a and a pointing device 214b coupled via an interface (I/F) 213. The pointing device 214b is for example a mouse, a track ball, or a flat device including a touch panel or an electrostatic sensor.

Further, the CPU 211 has a display 216 coupled via an interface 215, and a communicating circuit 218 coupled via an interface 217. The display 216 is for example a liquid crystal display or an electroluminescence panel. The communicating circuit 218 is for example a local area network board.

Further, an external storage device 220 is coupled to the CPU 211 via an interface 219, and a removable recording medium accessing device 222 is coupled thereto via an interface 221. The external storage device 220 is for example a hard disk. The removable recording medium that the accessing device 222 is to access is for example a CD (Compact Disc), a DVD (Digital Versatile Disk), or a flash memory card.

Next, an example of an internal configuration of the power source section 230 will be described. The DC-DC converter 1 and an AC adapter 231 are coupled to the main body section 210 via a switch 232. Power is supplied to the main body section 210 from one of the DC-DC converter 1 and the AC adapter 231. In the example of FIG. 14, the DC-DC converter 1 converts the input voltage Vin for example from a battery 233 to the output voltage Vout, and supplies the output voltage Vout to the main body section 210.

As the electronic device 200, a laptop personal computer, a communication device such as a cell phone, an information processing device such as a personal digital assistant (PDA), a video equipment such as a digital camera or a video camera, and a receiver such as a television device may be exemplified. Instead of the DC-DC converter 1, the DC-DC converters of the respective embodiments may be used in the electronic device 200.

In the illustrated embodiments, the transistor T1 in FIG. 3 and the transistor T2 in FIG. 15 may be referred to as a first switching element. The transistor T23 in FIG. 3 and the transistor T33 in FIG. 15 may be referred to as a second switching element. The transistor T24 in FIG. 3 and the transistor T32 in FIG. 15 may be referred to as a third switching element.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A DC-DC converter that converts an input voltage to an output voltage, the DC-DC converter comprising:
    a first switching element;
    a drive circuit coupled to the first switching element and configured to drive the first switching element so as to convert the input voltage to the output voltage;
    a second switching element coupled between a low potential power terminal of the drive circuit and a first node corresponding to the input voltage or the output voltage;
    a third switching element coupled between the low potential power terminal of the drive circuit and a second node having a potential lower than both the input voltage and the output voltage;
    a current detecting section configured to detect a load current flowing in an output terminal of the DC-DC converter; and
    a control circuit configured to turn on the third switching element in a case where a difference between the input voltage and the output voltage is lower than a threshold, and to control the second switching element and the third switching element based on a detection result of the current detecting section in a case where the difference is equal to or greater than the threshold.

2. The DC-DC converter according to claim 1, wherein the control circuit turns on one of the second switching element and the third switching element based on the detection result of the current detecting section.

3. The DC-DC converter according to claim 1, wherein:
    the control circuit includes a comparator configured to compare a multiplied value with a certain voltage value, the multiplied value being obtained by multiplying a current value detected by the current detecting section and a certain resistance value, and
    the control circuit controls the second switching element and the third switching element based on an output signal of the comparator.

4. The DC-DC converter according to claim 3, wherein the certain voltage value is determined based on an amount of loss according to charges accumulated in a control terminal of the first switching element and a loss increase by an on-resistance of the first switching element caused by a connection with the low potential power terminal of the drive circuit and the output terminal.

5. The DC-DC converter according to claim 1, wherein:
    the first switching element includes a terminal coupled to the second node, and
    during a period in which the first switching element is in an off-state, the control circuit turns on the second switching element for a predetermined time, and subsequently turns on the third switching element.

6. The DC-DC converter according to claim 1, wherein the control circuit includes a voltage detecting circuit configured to detect the difference between the input voltage and the output voltage in accordance with a voltage change in a control terminal of the first switching element.

7. The DC-DC converter according to claim 6, wherein the voltage detecting circuit detects the voltage change in the control terminal during a period in which the second switching element is in an on-state, and retains a detected result of the voltage change.

8. The DC-DC converter according to claim 6, wherein:
the control circuit includes a signal generating circuit configured to generate a periodic signal of a predetermined cycle, and
the control circuit resets a detected result of the voltage change responsive to the periodic signal, and thereafter retains the detected result of the voltage change.

9. The DC-DC converter according to claim 8, wherein:
the control circuit includes a switching element coupled between a resistive element having the certain resistance value and the second node and configured to turn on or off according to the periodic signal, and
the comparator operates and stops according to the periodic signal.

10. The DC-DC converter according to claim 8, wherein the signal generating circuit generates the periodic signal according to a switching cycle of the first switching element.

11. A DC-DC converter that converts an input voltage to an output voltage and supplies the output voltage to an output terminal of the DC-DC converter, the DC-DC converter comprising:
a first switching element;
a drive circuit coupled to the first switching element and configured to drive the first switching element so as to convert the input voltage to the output voltage;
a second switching element coupled between a low potential power terminal of the drive circuit and a first node corresponding to the input voltage or the output voltage;
a third switching element coupled between the low potential power terminal of the drive circuit and a second node having a potential lower than both the input voltage and the output voltage;
a control circuit configured to turn on one of the second switching element and the third switching element in accordance with a difference between the input voltage and the output voltage.

12. A method of controlling a DC-DC converter, the method comprising:
converting an input voltage to an output voltage by controlling a first switching element, and outputting the output voltage to an output terminal;
detecting a load current flowing in an external load coupled to the output terminal;
determining whether a difference between the input voltage and the output voltage is lower than a threshold;
controlling a second switching element coupled between a low potential power terminal of a drive circuit configured to drive the first switching element and a first node corresponding to the input voltage or the output voltage and a third switching element based on a detection result of the load current in a case where the difference is equal to or greater than the threshold; and
turning on the third switching element coupled between the low potential power terminal of the drive circuit configured to drive the first switching element and a second node having a potential lower than the input voltage and the output voltage in a case where the difference between the input voltage and the output voltage is lower than the threshold.

* * * * *